United States Patent [19]

Paulsen et al.

[11] Patent Number: 4,571,456
[45] Date of Patent: Feb. 18, 1986

[54] PORTABLE COMPUTER

[75] Inventors: David C. Paulsen, Santa Clara; Glenn T. Edens, Menlo Park; Karl S. Nakamura, Santa Clara; David M. Gallatin, San Jose; Stephen R. Hobson; William G. Moggridge, both of Palo Alto, all of Calif.

[73] Assignee: Grid Systems Corporation, Mountain View, Calif.

[21] Appl. No.: 435,126

[22] Filed: Oct. 18, 1982

[51] Int. Cl.⁴ .................... H04M 11/00; A47B 88/00; G09G 1/00
[52] U.S. Cl. .................... 179/2 C; 312/327; 248/455; 361/386; 340/700
[58] Field of Search ............ 179/2 C, 2 DP; 358/248, 358/249, 254; 340/700, 705; 248/447, 454–457; 312/198, 327, 328, 208, 294; 174/86; 49/167; 339/4; 361/383, 386, 387, 395, 399; 108/35, 39, 133; D14/100–106, 113, 115

[56] References Cited

U.S. PATENT DOCUMENTS

| | | | |
|---|---|---|---|
| 4,140,357 | 2/1979 | Wolz et al. | 174/86 X |
| 4,206,559 | 6/1980 | Brown | 248/455 |
| 4,291,198 | 9/1981 | Anderson et al. | 179/2 DP |
| 4,367,374 | 1/1983 | Serrano | 179/2 C |
| 4,409,641 | 10/1983 | Jakob et al. | 361/399 X |

OTHER PUBLICATIONS

Gokuraku I, Encyclopedia ASCII, vol. 2, Jul. 1978, pp. 256-258.

Primary Examiner—W. J. Brady
Attorney, Agent, or Firm—Donald C. Feix

[57] ABSTRACT

A portable computer is contained within an outer metal case which physically encapsulates and protects the working components of the computer in the closed, portable configuration. The metal case includes a base which serves as a heat sink for transferring waste heat from heat producing electrical components to the surroundings in the open, operating configuration of the computer. The heat producing components are mounted and located in the base to maximize the transfer of heat to the base. A display housing is pivotally mounted on the base by hinge assemblies for swinging movement between a closed and latched position on the base and an upward and rearwardly inclined angle for viewing by an operator positioned in front of the computer. Stop pins coact with the hinge assemblies for holding the display housing at the desired angle of view, and torsion springs are associated with the hinge assemblies for preventing inadvertent slamming of the display housing against the base during closing. Electrical cables are guided from the base through the hinge assemblies and to the display by cable guides which protect the cables against snagging and unnecessary flexure. A single connector connects an audio circuit on a modem to use either a standard hand set for voice communications or a passive speaker and microphone as an acoustic coupler for data communications.

19 Claims, 34 Drawing Figures

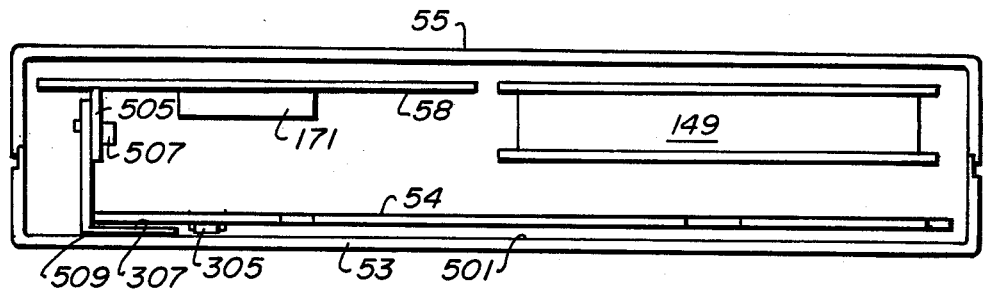
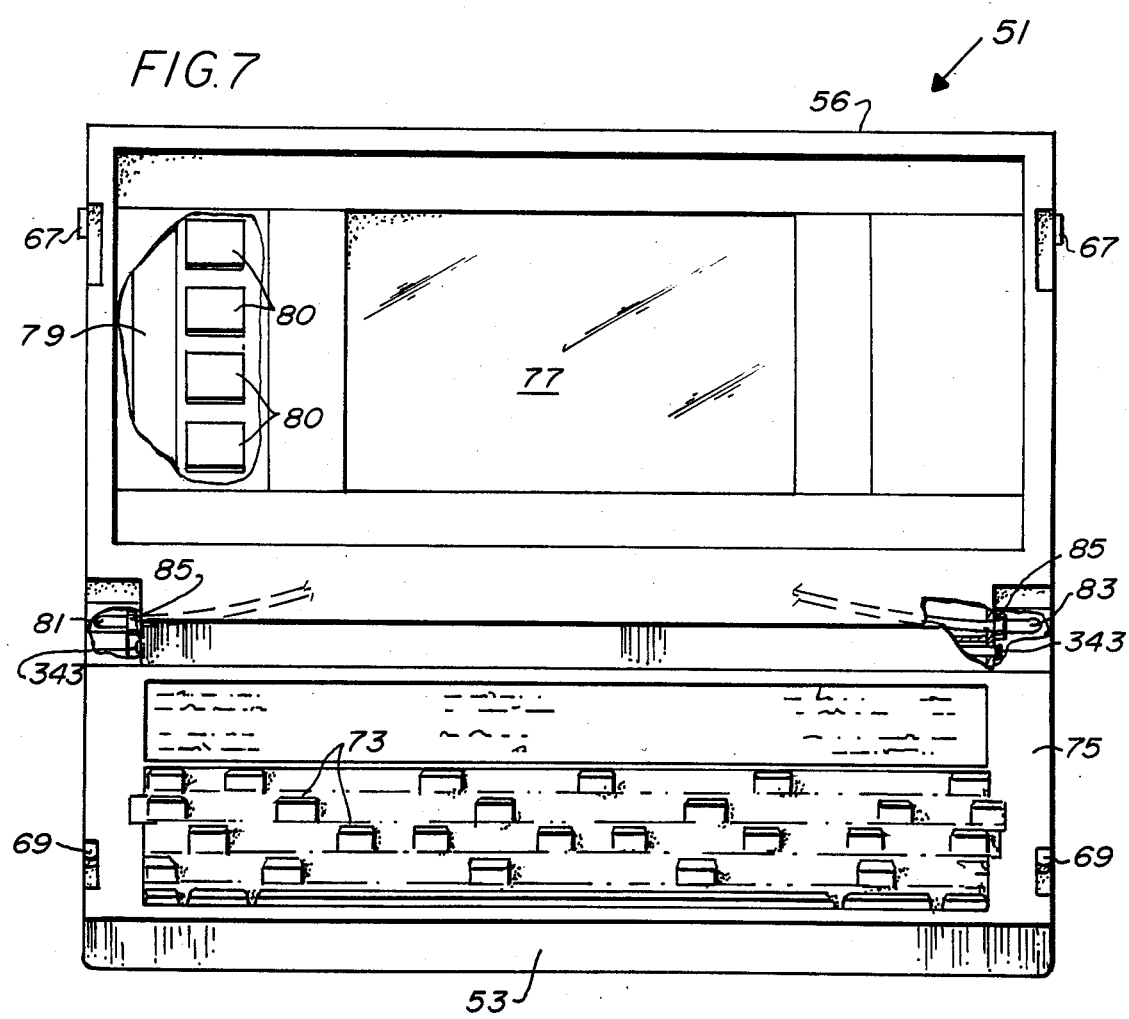

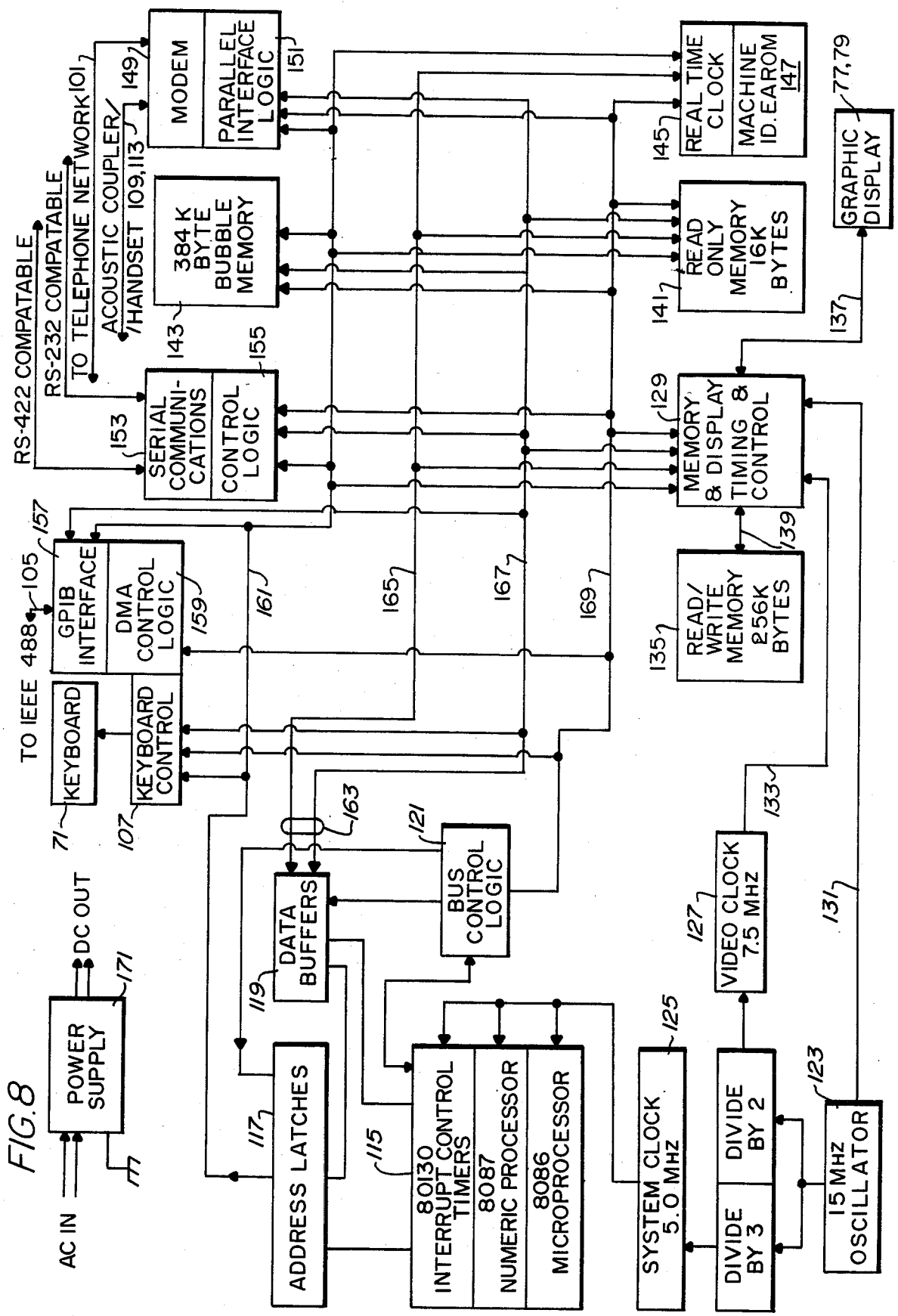

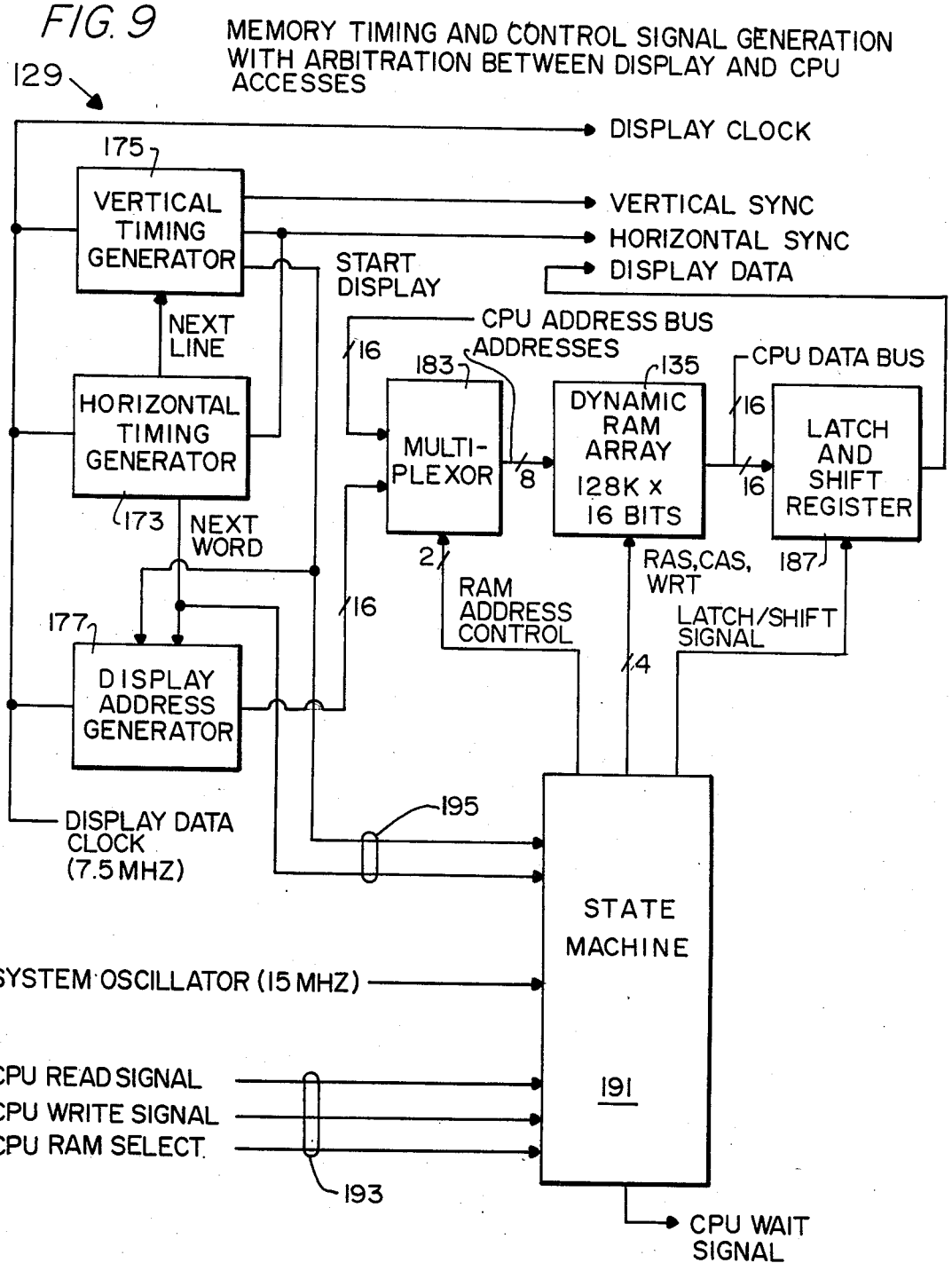

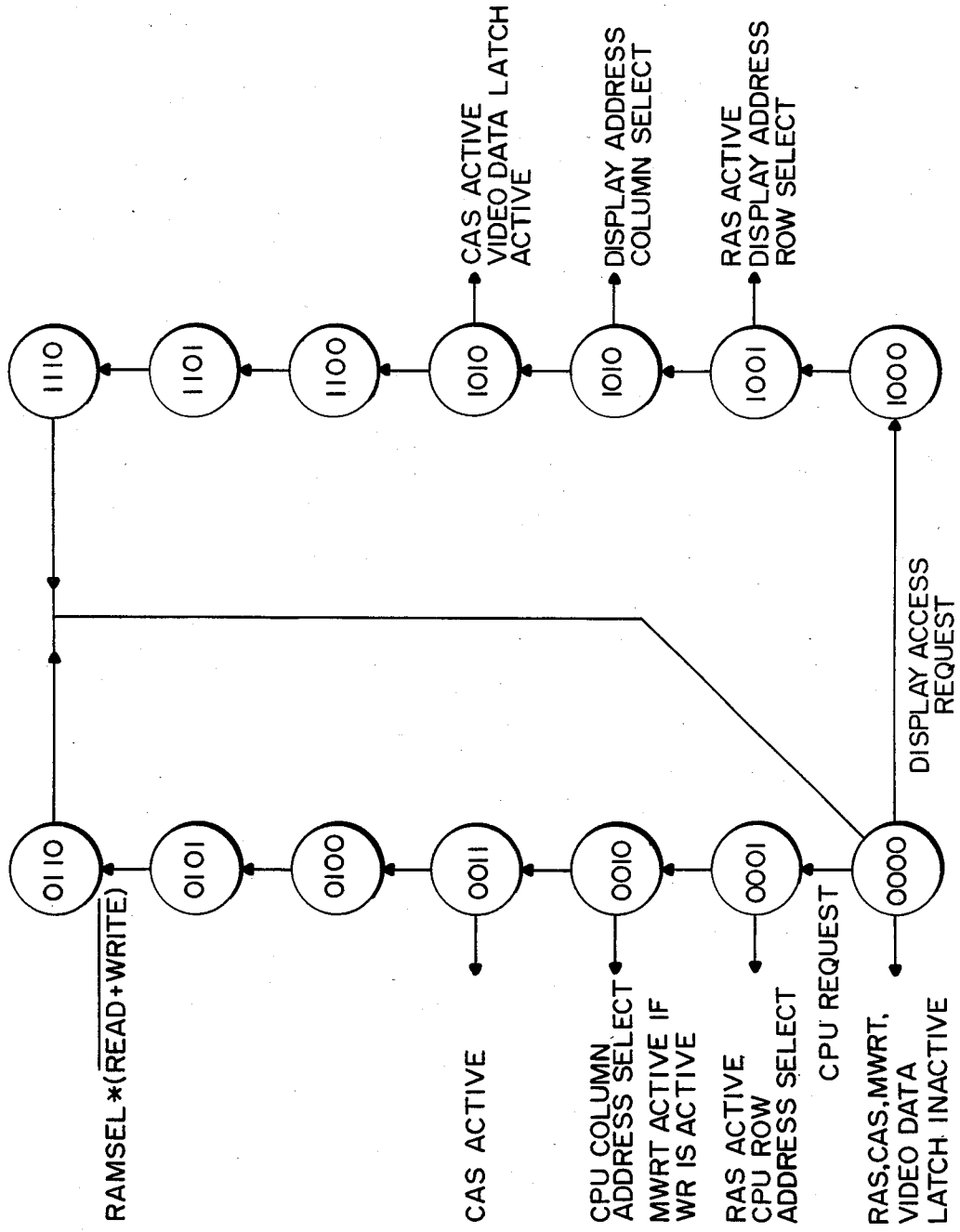
FIG. 10 MEMORY TIMING CONTROL STATE DIAGRAM

FIG. 11    A COMPACT SERIAL COMMUNICATIONS CONNECTOR
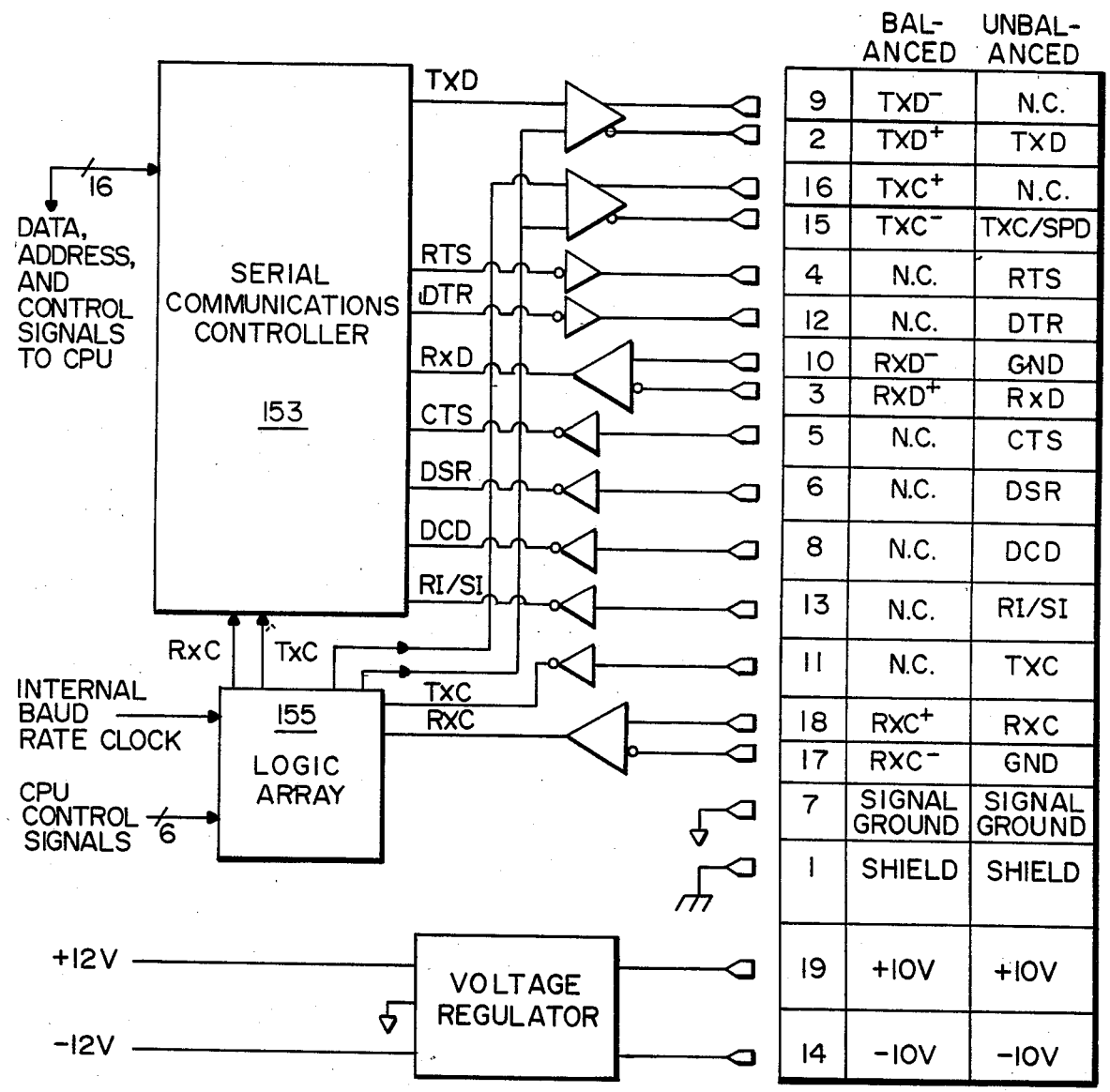

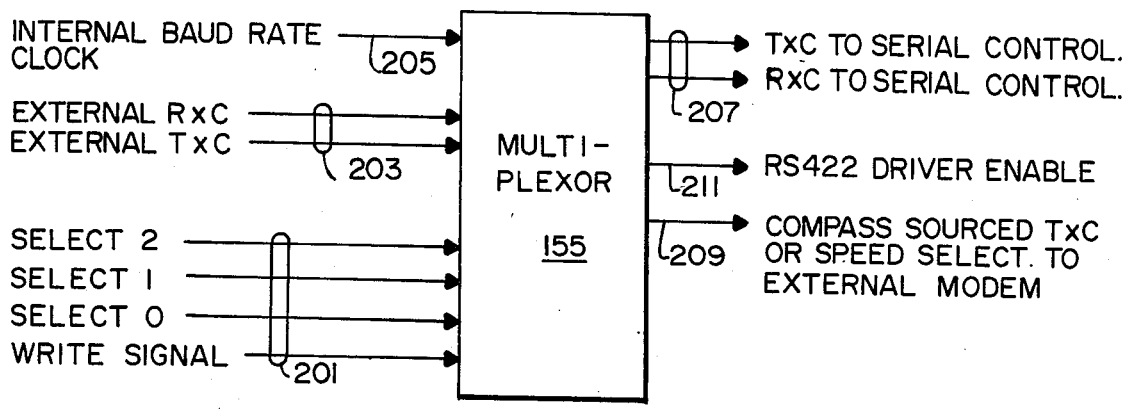
FIG. 12 SERIAL CLOCK SWITCHING LOGIC
| SELECT BITS | | | TO SERIAL CONTROLLER | | COMPASS SOURCED | RS422 |
|---|---|---|---|---|---|---|
| 2 | 1 | 0 | TxC | RxC | TxC | DRIVER ENABLE |
| 0 | 0 | 0 | BAUD | BAUD | BAUD | ON |
| 0 | 0 | 1 | EXTX* | EXRX* | BAUD | ON |
| 0 | 1 | 0 | BAUD | BAUD | LOW | ON |
| 0 | 1 | 1 | EXTX | EXRX | LOW | ON |
| 1 | 0 | 0 | BAUD | BAUD | HI | ON |
| 1 | 0 | 1 | EXTX | EXRX | HI | ON |
| 1 | 1 | 0 | BAUD | EXRX | BAUD | OFF |
| 1 | 1 | 1 | BAUD | EXRX | BAUD | ON |
\*EXTX  EXTERNAL TXC
\*EXRX  EXTERNAL RXC
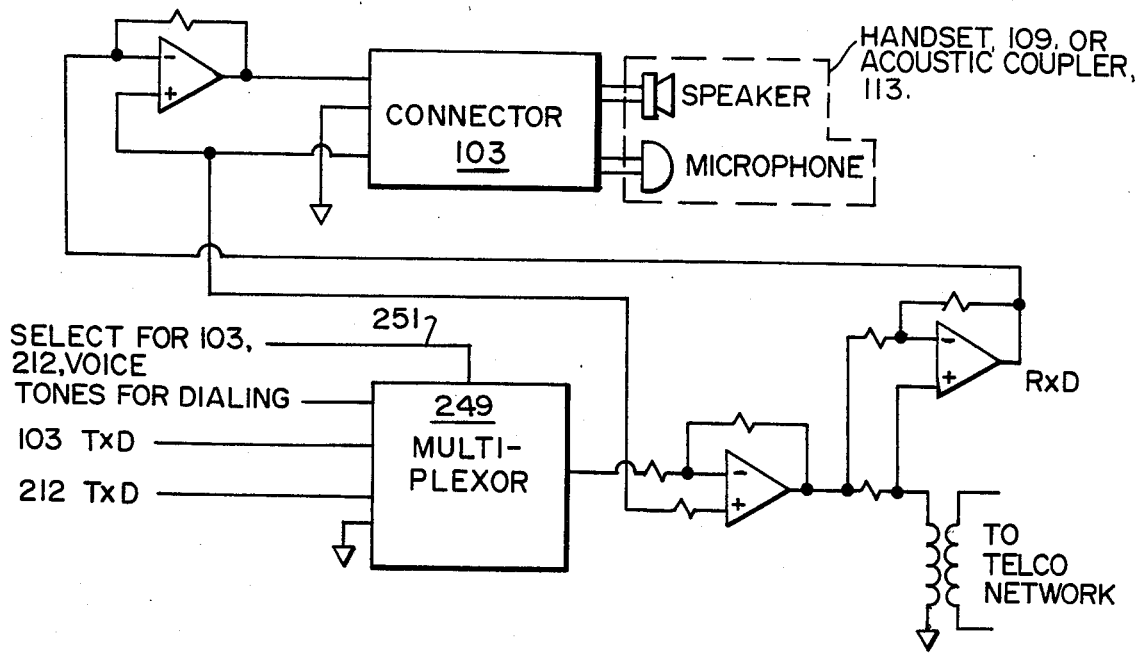
FIG. 18

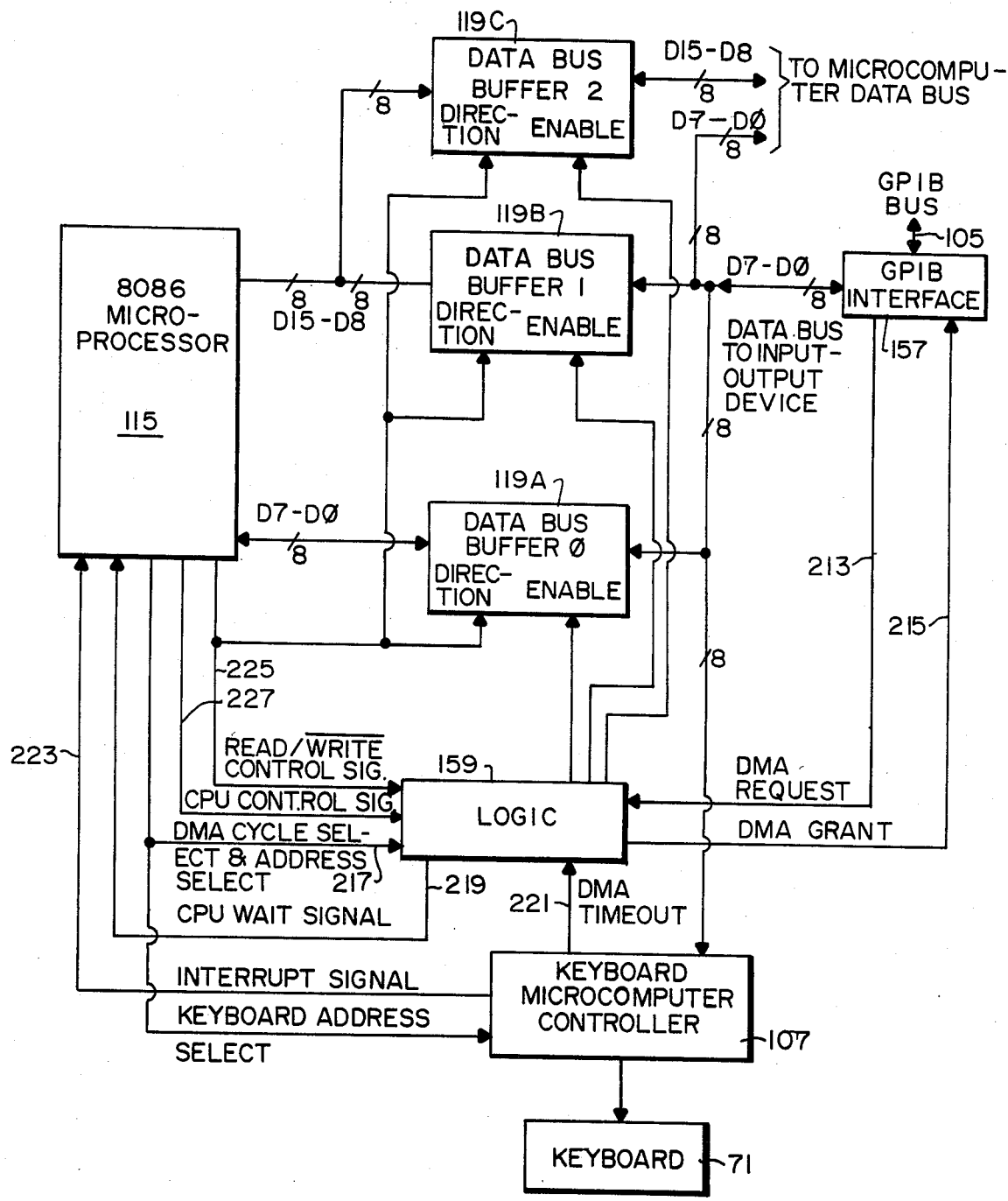
FIG. 13  DMA FACILITY FOR 16 BIT PROCESSORS

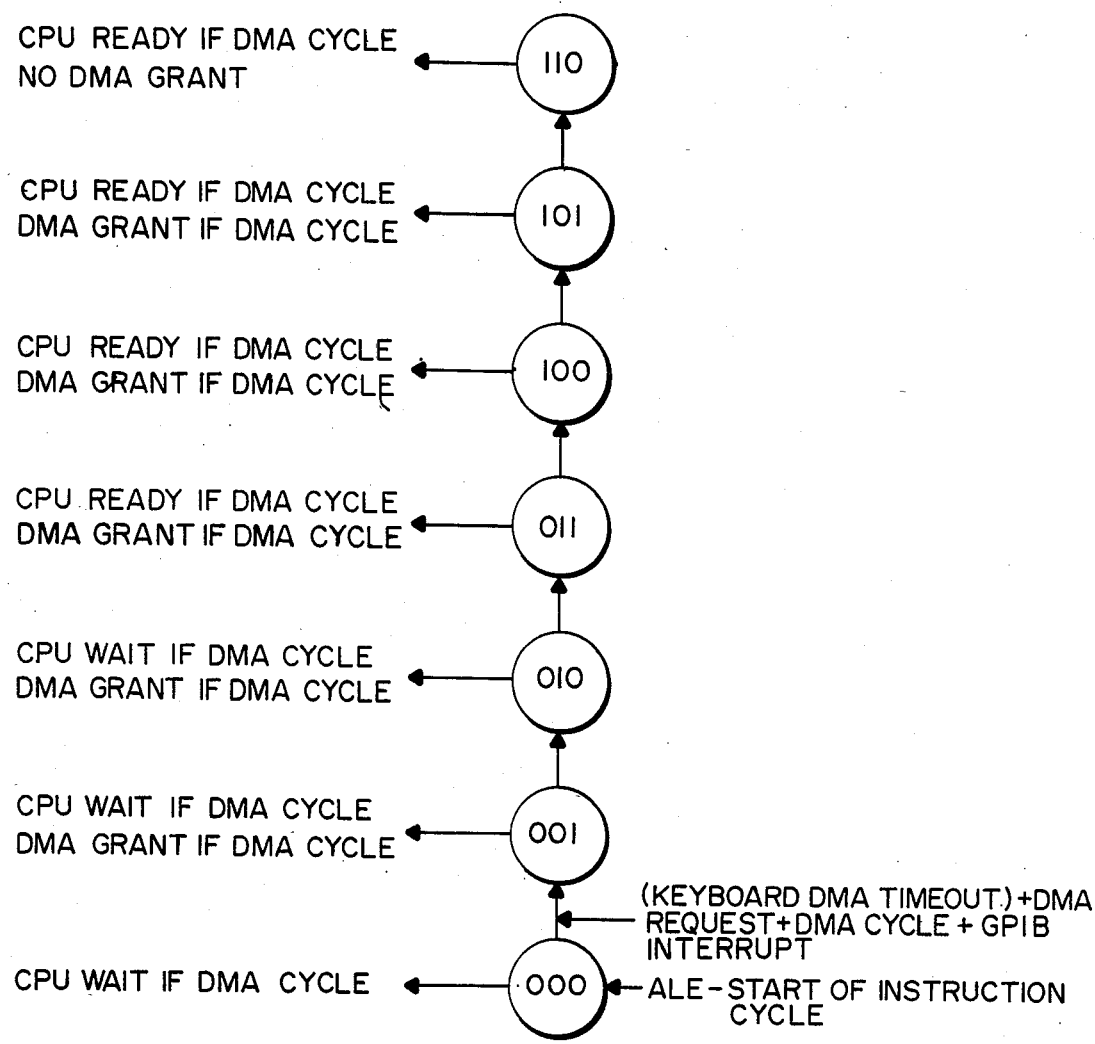
FIG. 14   DMA CONTROL LOGIC STATE DIAGRAM

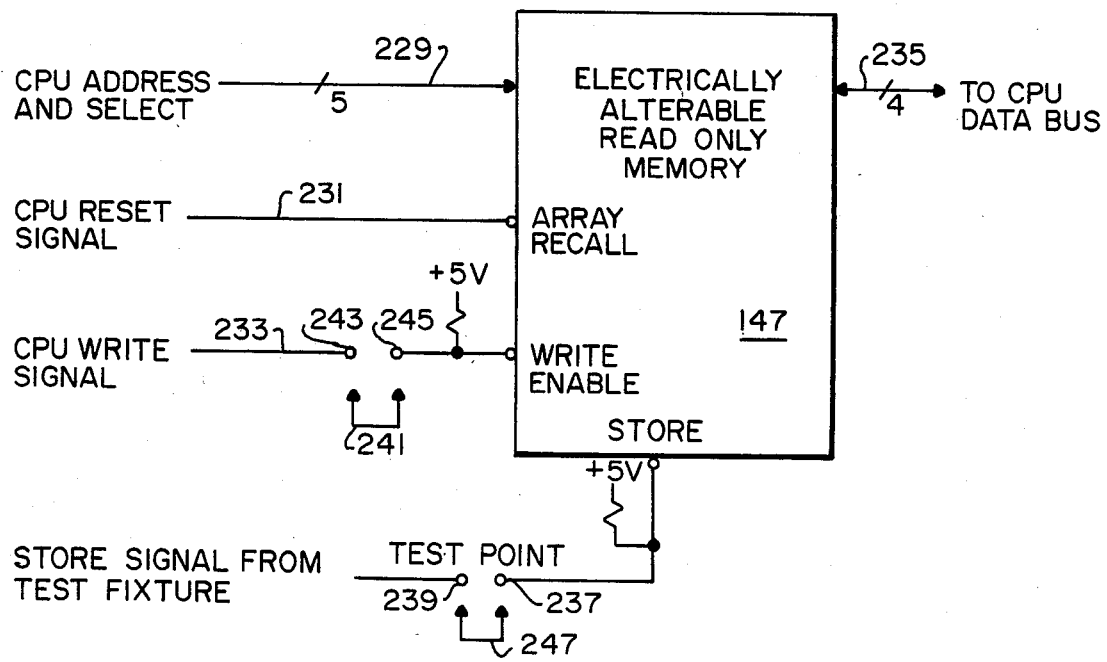
FIG. 15  MACHINE IDENTIFICATION EAROM
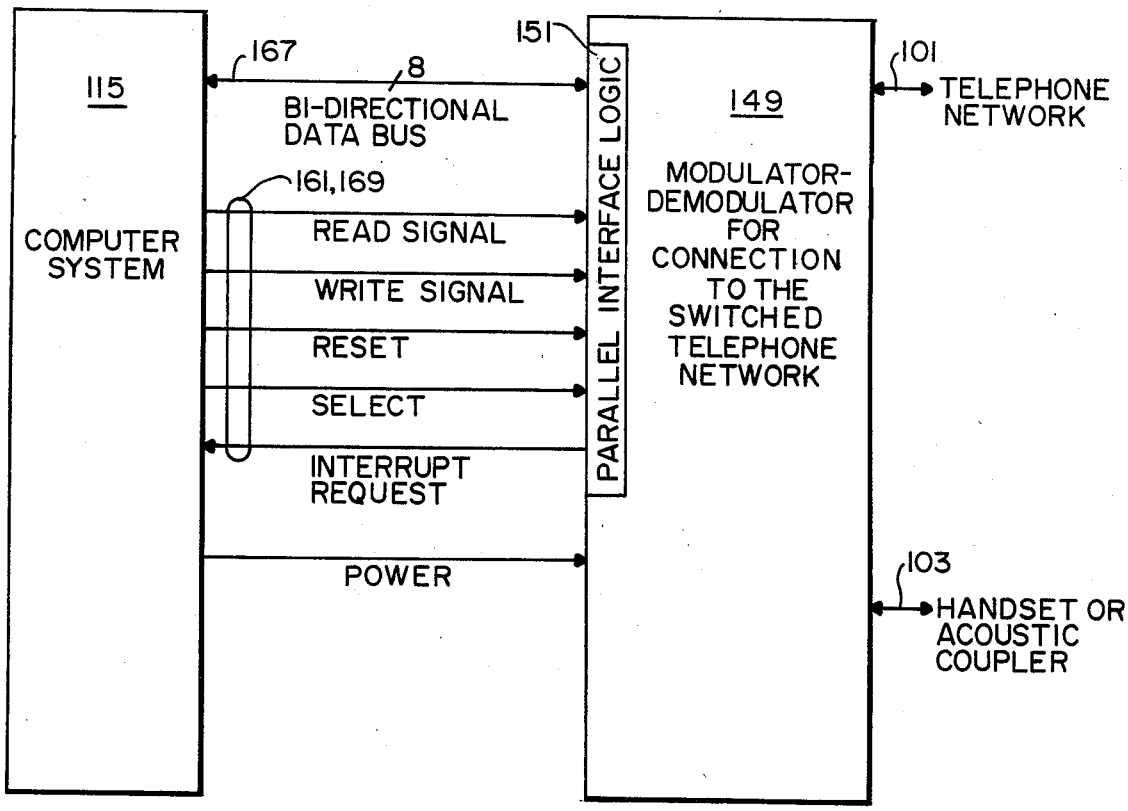
FIG. 16  PARALLEL MODEM INTERFACE

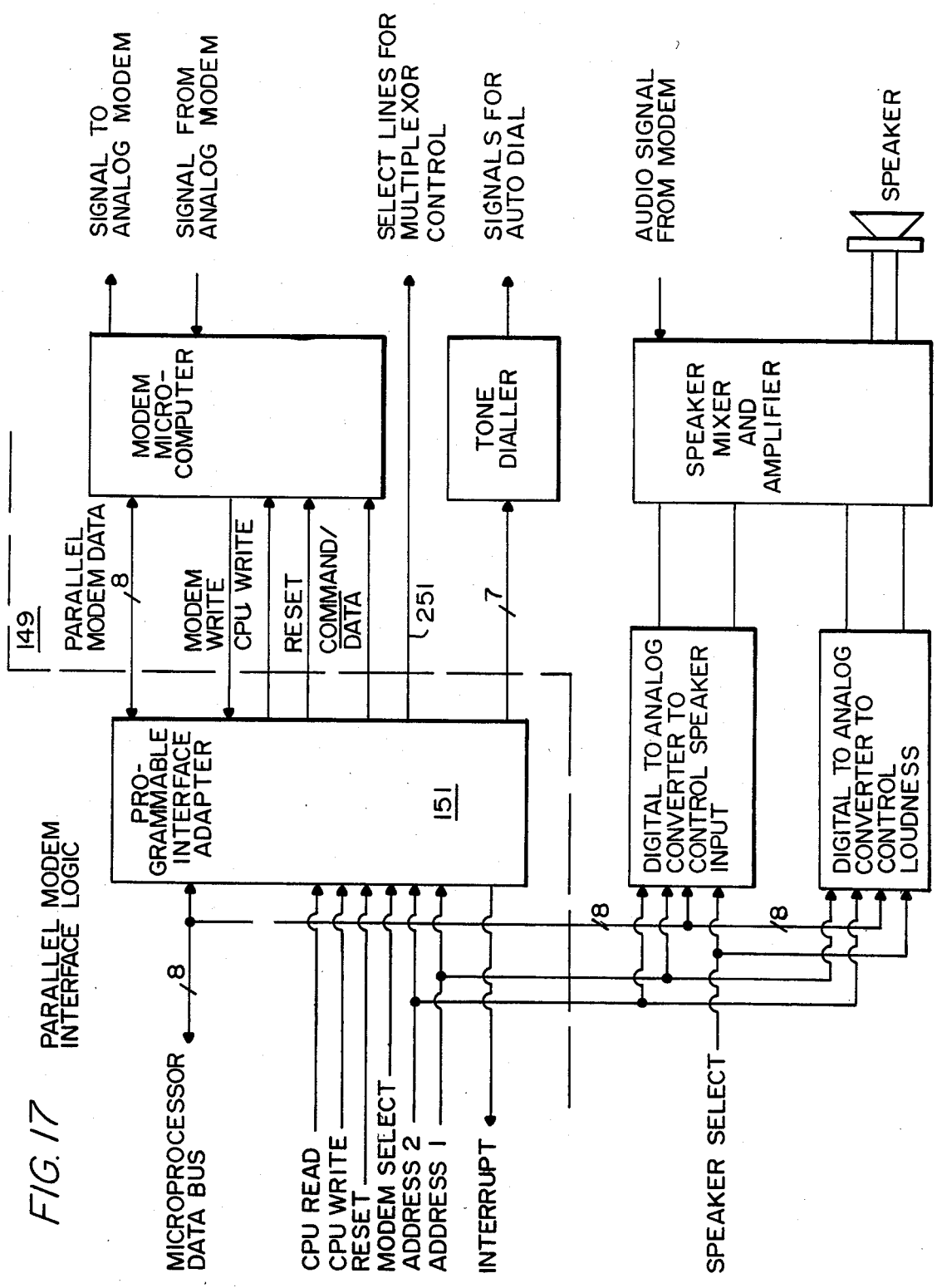

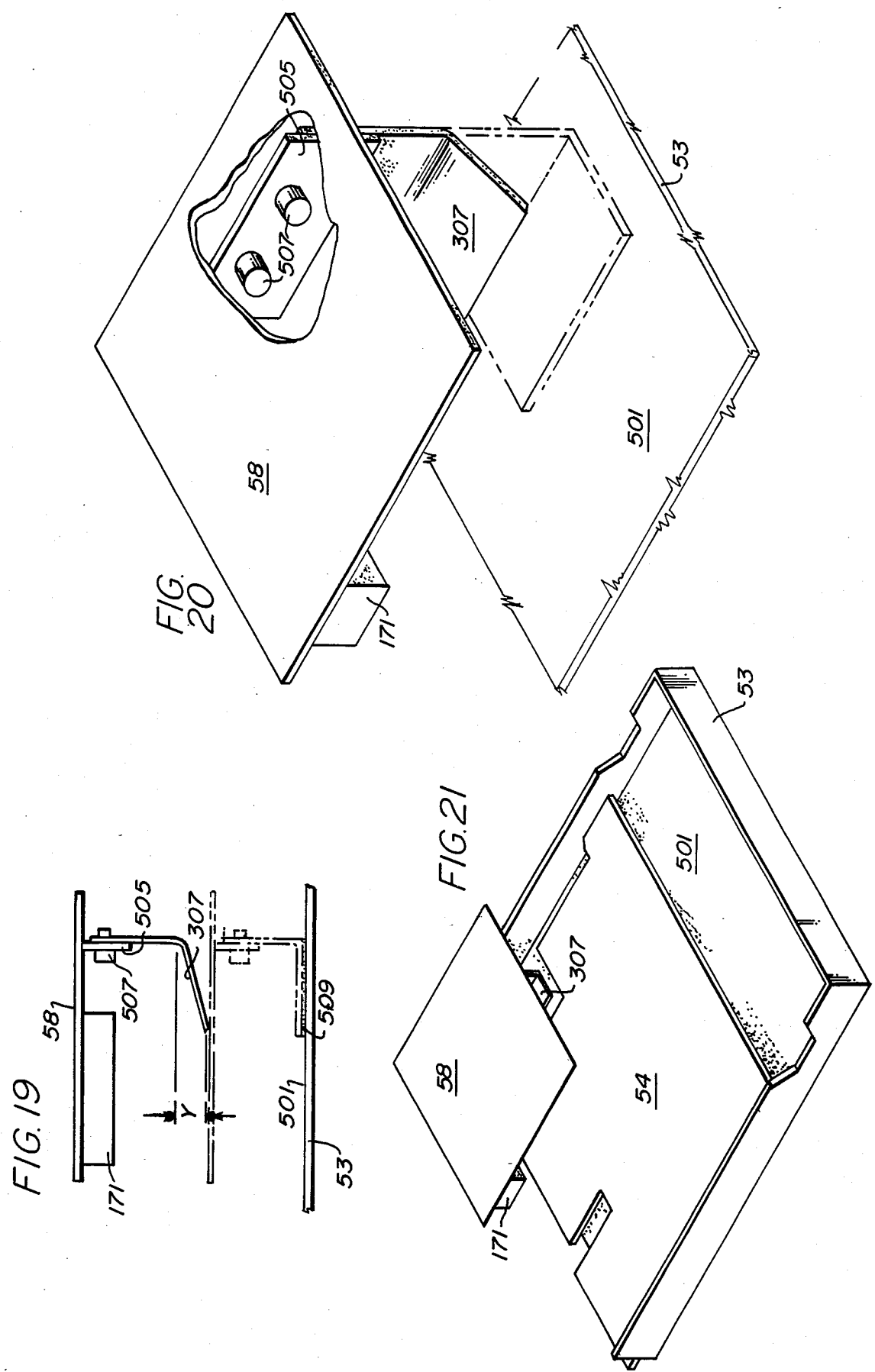

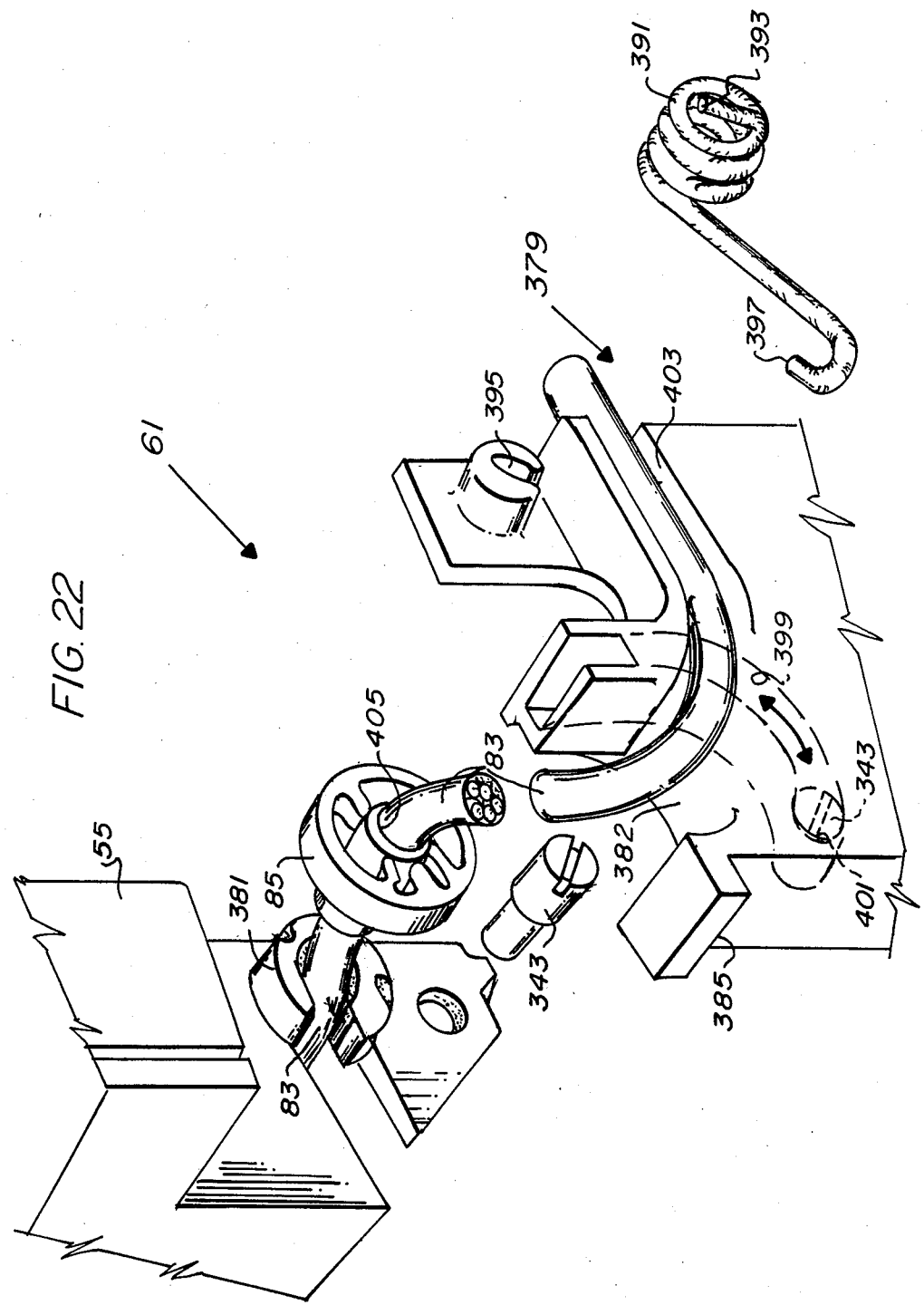

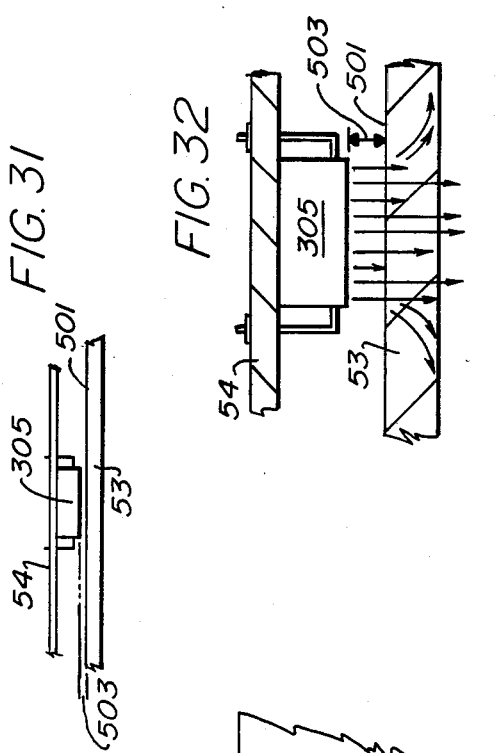
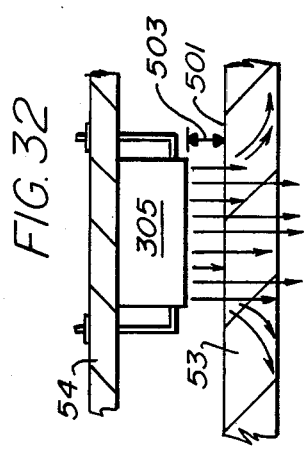
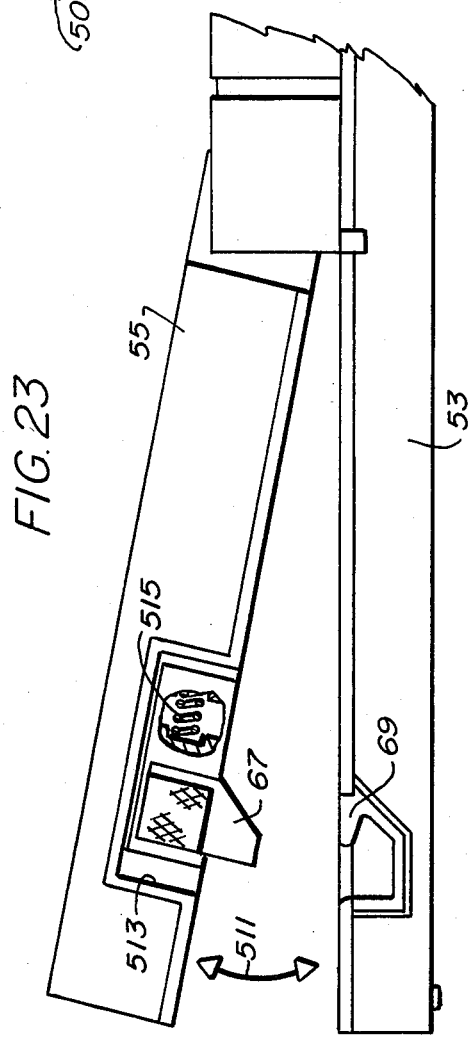
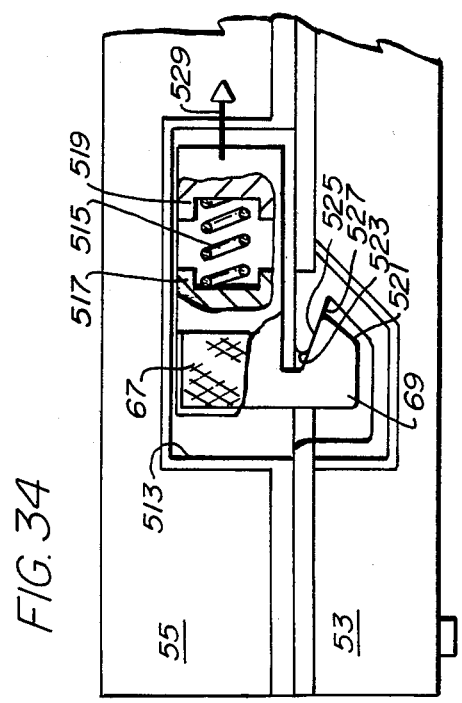
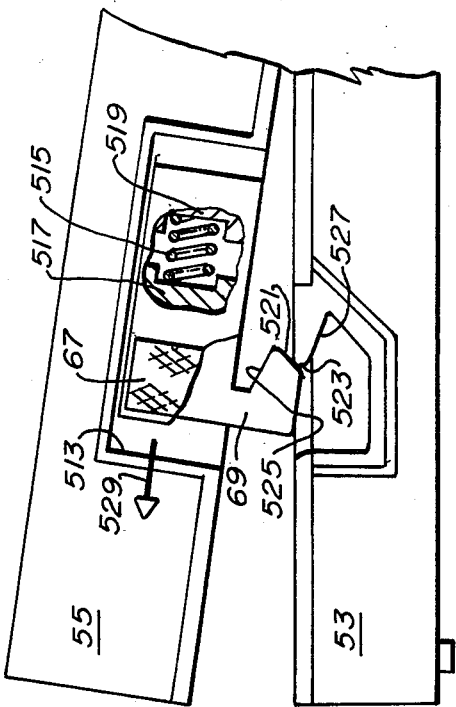

PORTABLE COMPUTER

BACKGROUND OF THE INVENTION

This invention relates to a powerful, portable, personal computer. It relates particularly to a personal computer that provides substantial stand alone data processing capabilities and which is also capable of being connected to local support services (by connectors on the computer) and to remote large main frame computers, program and data bases (over standard telephone lines).

A personal, portable computer for use by businessmen must meet a number of requirements to be truly personal and portable.

First of all, to be portable, the computer should be sufficiently small and light weight to be readily carried in a brief case while still leaving space in the brief case for files and other materials.

The computer should have a display which is easily viewed and large enough to display graphics and text clearly.

The personal computer should be relatively unobtrusive when set up in the operating configuration.

The computer should have sufficient main memory storage to offer substantial stand alone data processing capabilities, and it is desirable that the computer have both a non-volatile memory for storing data and programs without the need for electrical power and a fast access semiconductor storage for normal operation.

The computer should have integral, high speed multiple communications ports so that the computer can be connected to peripherals to provide support services locally and to eliminate the need for each user to have a dedicated unit.

The computer should also be capable of being connected over standard telephone lines both to large main frame computers and data bases for data and programs and to other personal computers for electronic mail and other communications.

The computer should have sufficient power to accomplish all the above noted different modes of operation and should be constructed with a heat sink feature to utilize that power without the danger of over-heating.

The personal, portable computer should be capable of accessing and using information where and when the information is needed by the user.

A portable computer which incorporates the features and which is effective to function as described above constitutes an object of this invention.

SUMMARY OF THE INVENTION

A computer constructed in accordance with one embodiment of the present invention is contained within an outer metal case which physically encapsulates and protects the working components of the computer in the closed, portable configuration.

The computer comprises a base, a display housing, a top cover, a rear cover, and hinge assemblies for permitting swinging movement of the display housing about an axis of a rotation adjacent the rear end of the display housing from the closed and latched position of the display housing on the base to an erected position for viewing by an operator.

The hinge assemblies are located in a mid portion of the base, and stop pins coact with the hinge assemblies to hold the display housing at an upwardly and rearwardly inclined angle for viewing by an operator positioned in front of the computer.

Torsion springs in the hinge assemblies bias the display housing upwardly from the latched position and are effective to prevent slamming of the display housing onto the base as the display housing is moved toward the closed and latched position.

Electrical cables are guided from the base through the hinge assemblies and to the display housing by cable guides which protect the cables against snagging and unnecessary flexure during pivoting movement of the display housing.

A keyboard frame cover encloses the keyboard area and includes a trough which provides clearance for the swinging movement for the inner end of the display covering the related portion of the base in a way to prevent entry of foreign objects, such as pencils and paper clips.

Latch mechanisms are recessed in the base and the display housing to securely latch the display housing to the closed condition of the computer and to minimize the chance of inadvertent and unwanted unlatching of the display housing.

A support leg is mounted in the base and is rotatable from a retracted position against the base in the closed condition of the computer to an extended position in the erected and operating configuration of the computer to elevate the rear end of the computer at the desired angle for operation.

In a specific embodiment of the invention, the display housing includes an electroluminescent display.

The power supply and electrical components for operating the computer are mounted in the base in a way to use the metal base as a heat sink for dissipating the heat produced by the heat producing components of the electrical circuitry. Integrated circuit components are spaced from the inner surface of the base by an air gap which is sufficiently small to cause a highly efficient transfer of heat by radiation and conduction from each individual component of the integrated circuit to the metal base through the air gap. The power supply components are mounted on a metal bracket associated with a leaf spring which engages the metal base for transferring the waste heat of the power supply components to the metal base through the metal bracket and the leaf spring.

In a preferred embodiment of the invention the metal case is made of magnesium for light weight with adequate strength and heat transfer characteristics.

The central processing unit (CPU) and the display of the computer both access the same main read/write memory. Arbitration means interleave the display and CPU dual accesses to the main memory to provide the required non-interruptable accesses and periodic refresh of the display without degrading the performance of the CPU.

The CPU includes a sixteen bit microprocessor, and the computer has a GPIB interface. Logic is operatively associated with the microprocessor in the GPIB interface to use an instruction in the microprocessor in combination with a capability of the GPIB interface to provide fast data transfer into and out of the GPIB interface without the use of extensive logic.

A pin arrangement of a compact nineteen pin connector is used in combination with a serial communications interface and control logic to support both a high speed balanced serial link and a low speed unbalanced versatile clock switching, depending upon the mode to which the control logic is switched, in the single connector.

The computer has a modem which permits connection to a switched telephone network which is included as an integral part of the computer. Parallel interface logic is operatively associated with the modem and the CPU for permitting the parallel transfer of data and control between the CPU and the modem.

The computer includes a single connector for connecting an audio circuit on the modem to use either a standard hand set for voice communications or a passive speaker and microphone as an acoustic coupler for data communications.

A machine readable serial number for the computer is stored in an electrically alterable read/only memory in a way that permits the manufacturer to alter the number electrically while preventing a user from readily altering the number.

Portable computer apparatus and methods which incorporate the features noted above and which are effective to function as described above constitute further objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF DRAWING VIEWS

FIG. 1 is a side elevation view of a portable computer constructed in accordance with one embodiment of the present invention. FIG. 1 shows the computer with the display opened up for use. FIG. 1 also shows the computer with the support leg extended.

FIG. 2 is partly broken away to show details of con- struction.

FIG. 5 shows the location of the logic board and the power supply within the bottom part of the case for the computer.

FIG. 6 is a rear elevation view taken along the line and in the direction indicated by the arrows 6—6 in FIG. 1. FIG. 6 shows the vertical orientation of the modem assembly, the power supply assembly and the logic board for the display.

FIG. 7 is a plan view taken along the line and in the direction indicated by arrows 7—7 in FIG. 1 and shows the display and the mounting of the display and the logic board within the display assembly. FIG. 7 also shows the routing of the cables into the hinge assembly.

FIG. 8 is an overall block diagram of the electrical components of the computer shown in FIG. 1.

FIG. 9 is a block diagram showing the memory timing and control signal generation with arbitration between the display and CPU accesses.

FIG. 10 is a state diagram for the memory timing control for the block labeled "State Machine" in FIG. 9.

FIG. 11 is a diagram of a compact serial communications connector and shows details of the block entitled "Serial Communications, and Control Logic" in FIG. 8.

FIG. 12 shows details of the switching logic noted as "Logic Array" in FIG. 11.

FIG. 13 is a diagram showing details of the components entitled "GPIB Interface*and DMA Control Logic"

FIG. 14 is a state diagram for the DMA control logic 159 shown in FIG. 13.

FIG. 15 shows details of the Machine Identification EAROM shown in FIG. 8.

FIG. 16 shows a parallel modem interface for the computer. The parallel modem interface shown in FIG. 16 includes the Parallel Interface Logic indicated by the reference numeral 151 in FIG. 8.

FIG. 17 shows details of the parallel modem interface logic shown in FIG. 16.

FIG. 18 shows the construction which permits the computer to be connected to an audio circuit on a modem to use either a standard handset for voice communications or a passive receiver and microphone as an accoustic coupler for data communications.

FIG. 19 is a fragmentary elevation view, partly in cross section to show details of construction, and is taken along the line and in the direction of the arrows 19—19 in FIG. 5. FIG. 19 shows details of a flexible spring mechanism used for the power supply heat sink.

FIG. 20 is a fragmentary, exploded, isometric view showing further details of the construction of the power supply heat sink structure shown in FIG. 18.

FIG. 21 is an isometric view showing the lower case or base 53 and the way that the power supply heat sink mounts in the lower case. FIG. 21 also shows the orientation of the logic board with respect to the power supply heat sink in the lower case.

FIG. 22 is an isometric, exploded view of one hinge assembly and shows details of a pivot bearing and stop pin structure and details of the cable routing guides through the hinge assembly.

FIG. 23 is a side elevation view showing the display housing 55 being held open by the torsion spring and showing in the block arrow the direction of movement of the display housing 55 with respect to the base 53 in the latching and unlatching operation.

Figure 24:
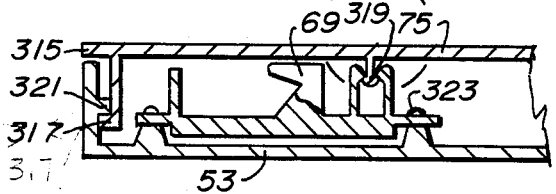
Figure 25:
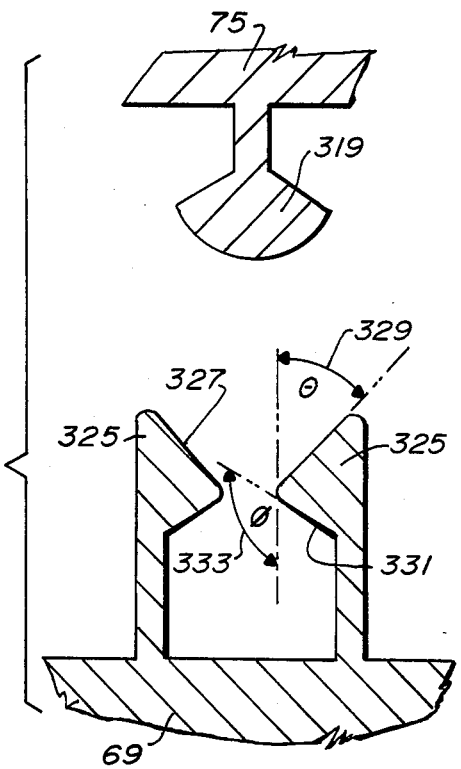

FIG. 24 is a fragmentary, enlarged, elevation view, partly in cross section showing details of a hook and snap mechanism for holding the keyboard frame in place in the base. FIG. 25 is taken along the stepped line and in the direction indicated by the arrows 24—24 in FIG. 3.

FIG. 25 is a fragmentary, enlarged view of the portion of FIG. 24 shown encircled by the arrows 25—25 in FIG. 24.

Figure 3:
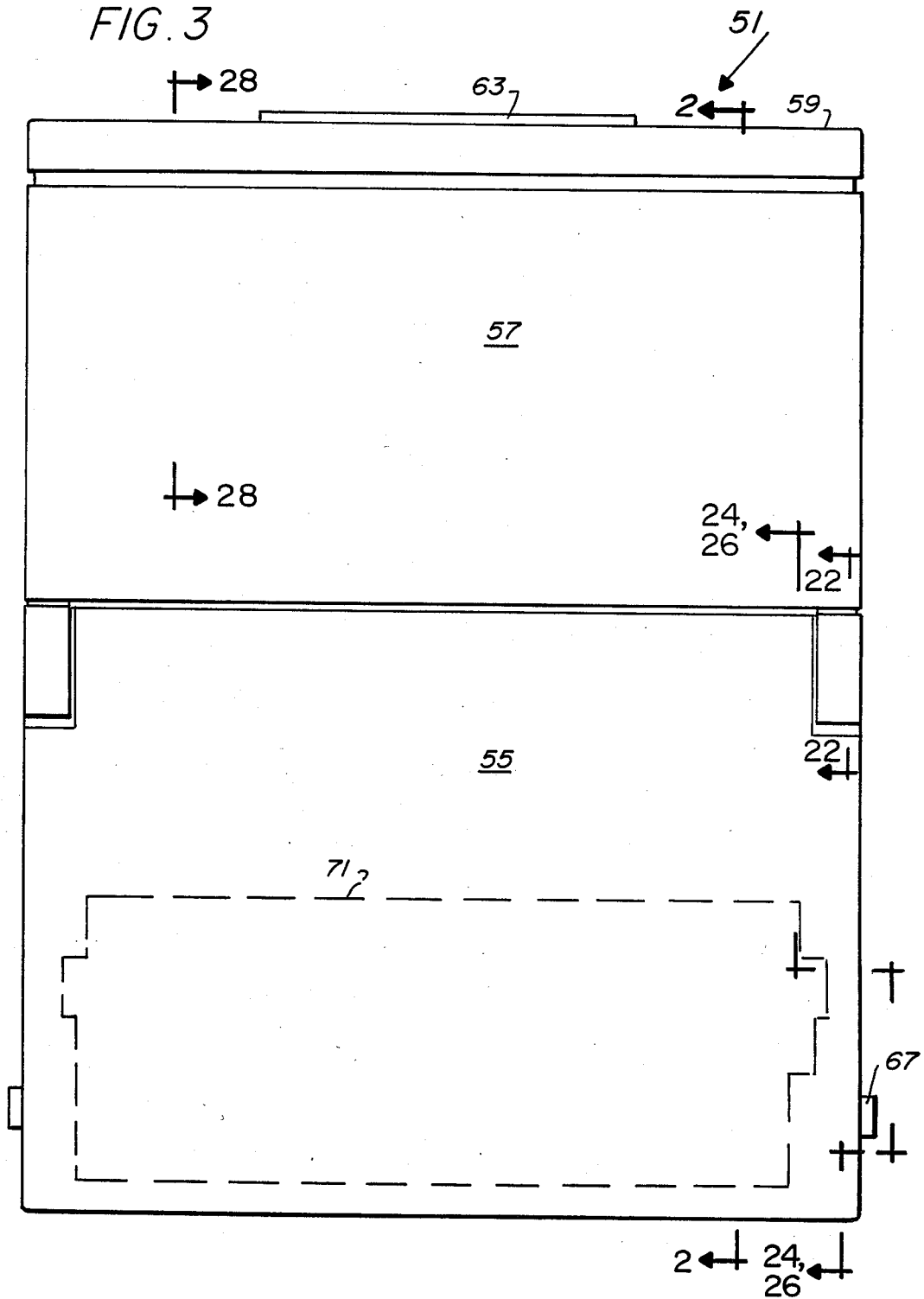
FIG. 3 is s a top plan view taken along the line and in the direction indicated by the arrows 3—3 in FIG. 2.
Figure 26:
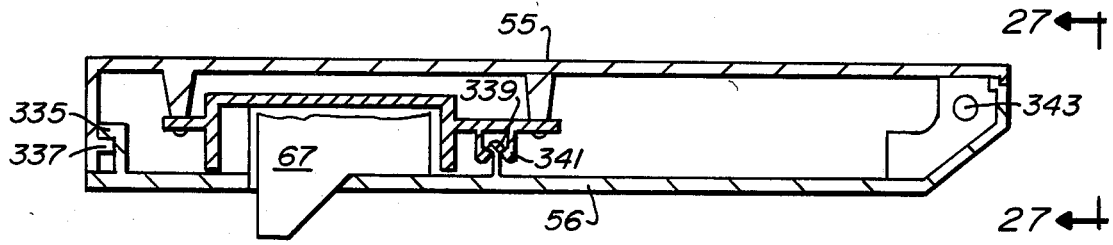

FIG. 26 is an elevation view, partly in cross section to show details of construction, and is taken along the stepped line 26—26 in FIG. 3. FIG. 26 shows details of how the display frame is assembled in the display housing.

Figure 27:
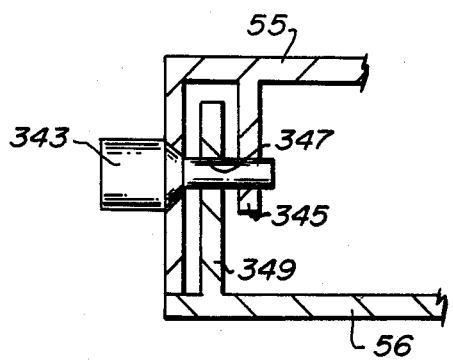

FIG. 27 is a fragmentary, enlarged view taken along the line and in the direction indicated by the arrows 27—27 in FIG. 26.

Figure 28:
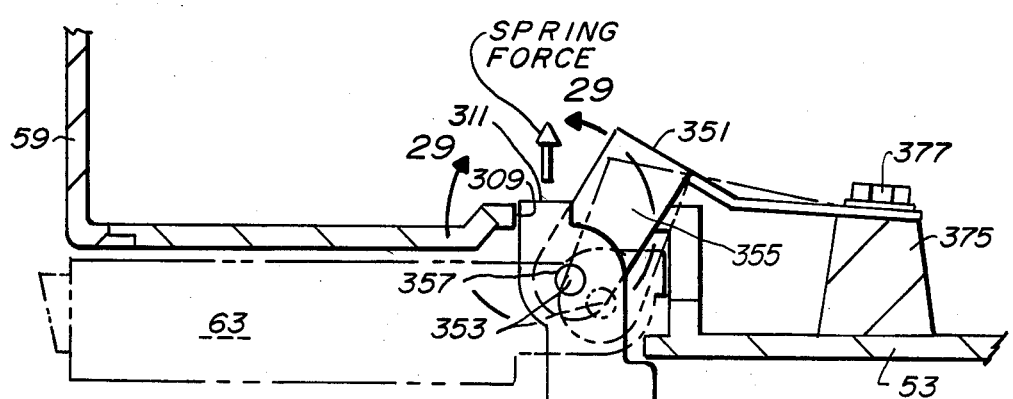

FIG. 28 is a fragmentary elevation view taken along the line and in the direction indicated by the arrows 28—28 in FIG. 3. FIG. 28 shows details of the structure for pivoting and locking of the leg in the base. The leg is shown in bold outline in its extended position and is shown in dashed outline in its retracted position in FIG. 28.

Figure 29:
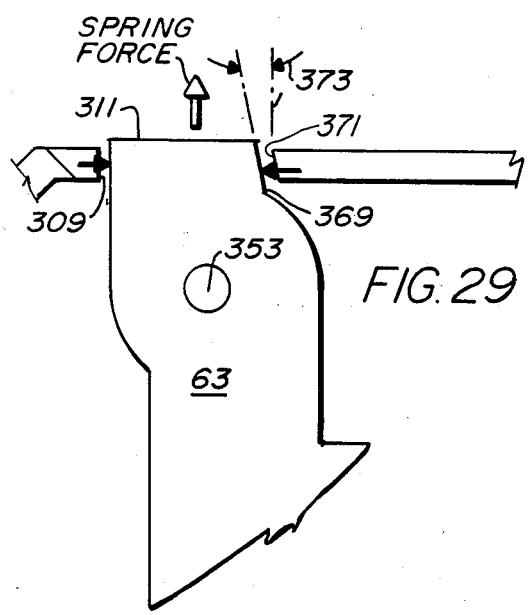

FIG. 29 is a fragmentary enlarged view of the portion of FIG. 28 shown encircled by the arrows 29—29 in FIG. 28.

Figure 30:
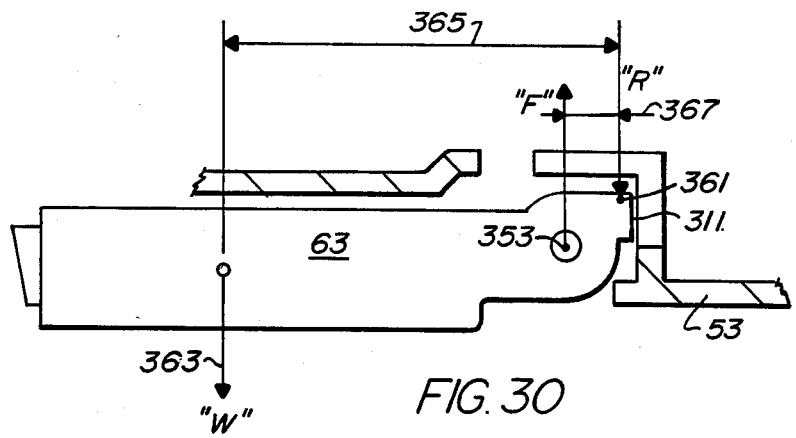

FIG. 30 is a diagram illustrating the forces involved in retaining the leg 63 in the retracted position.

Figure 5:
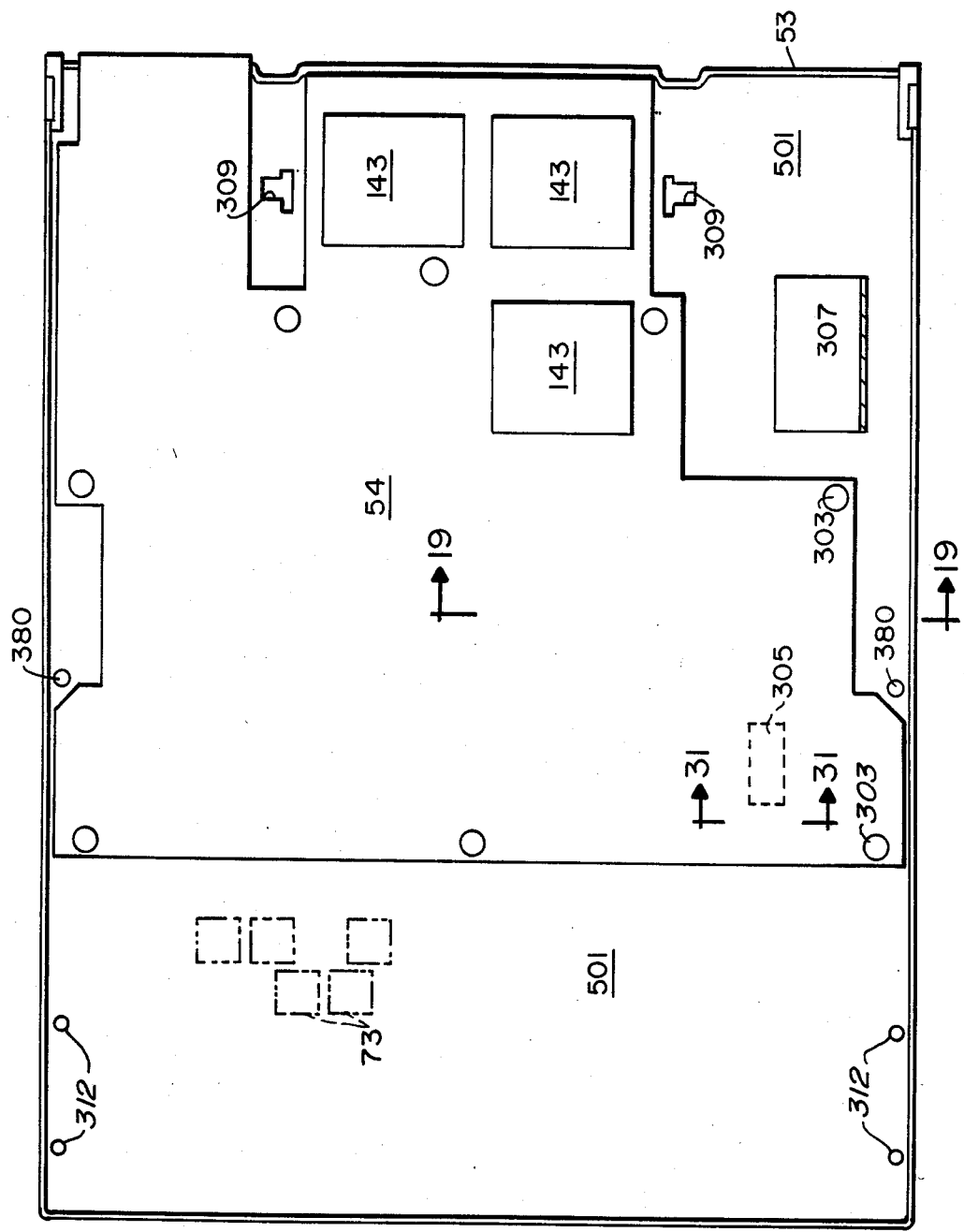
FIG. 5 is a plan view taken along the stepped line and in the direction indicated by the arrows 5—5 in FIG. 1.

FIG. 31 is a fragmentary elevation view taken along the line and in the direction indicated by the arrows 31—31 in FIG. 5. FIG. 31 shows the location of the logic board with respect to the base for providing heat transfer between the heat producing components of the logic board and the base.

FIG. 32 is a view like FIG. 31 but enlarged to show the paths for conduction of heat by radiation and conduction.

FIG. 33 is an enlarged view like FIG. 23 but showing the parts of the latch assembly as these parts initially engage in the closing, latching operation.

FIG. 34 is a view like FIG. 33 but showing the component parts of the latch assembly with the display housing latched to the base of the computer.

DETAILED DESCRIPTION OF THE PREFERRED EMBODIMENTS

Figure 1:
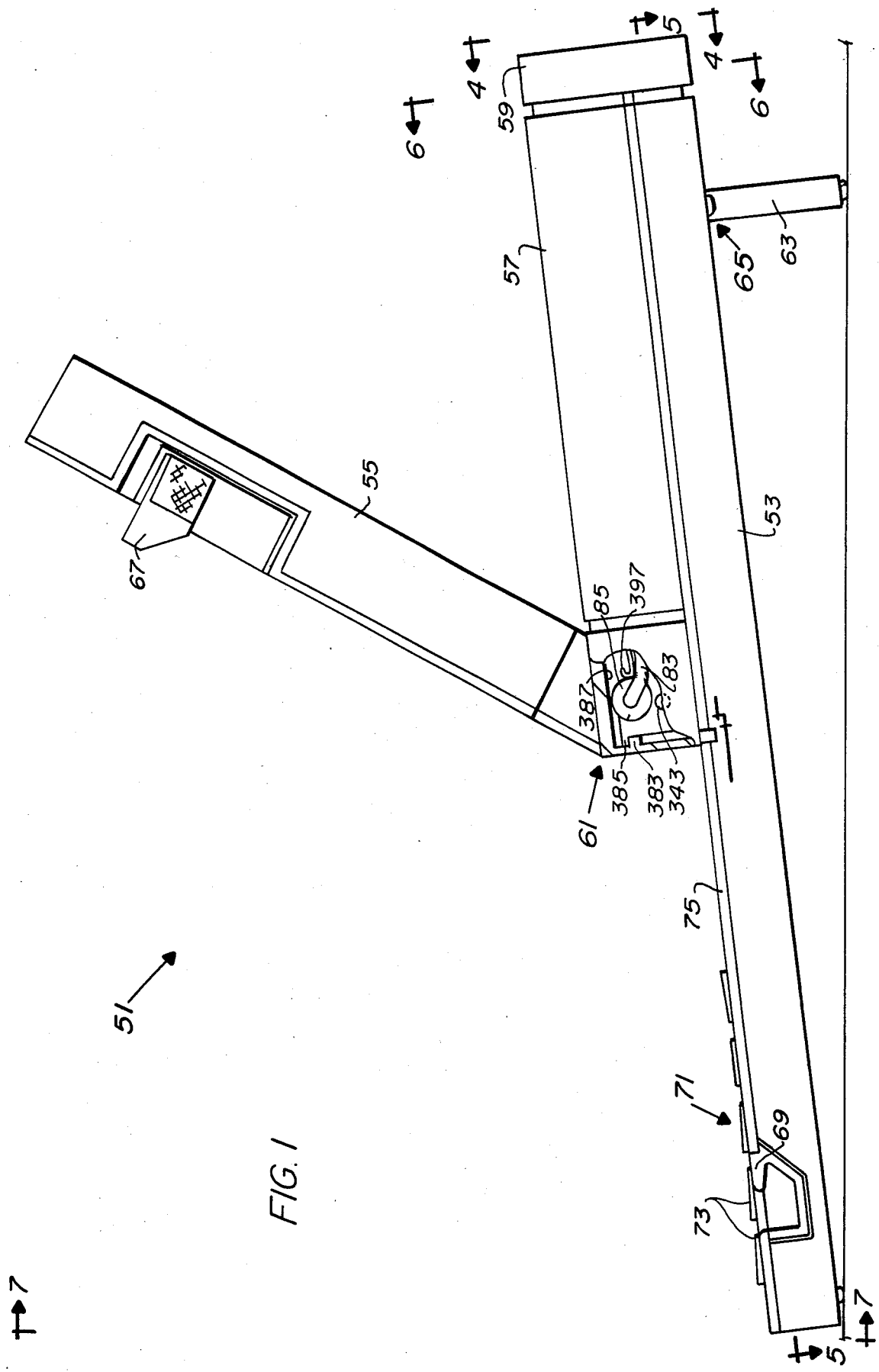

A computer constructed in accordance with one embodiment of the present invention is indicated generally by the reference numeral 51 in FIG. 1.

The computer 51 is contained within an outer case. The outer case comprises a base 53, a display housing 55, a top cover 57 and a rear cover 59.

The display housing 55 is pivotally connected to the base 53 by two hinge assemblies 61.

A leg 63 is pivotally connected to the base 53 by a double hinge assembly 65 (described in more detail below).

The display housing 55 latches to the base 53 by a latch mechanism comprising an upper, sliding latch piece or slider 67 and a lower, fixed latch piece 69 which provides a latch pocket (described in more detail below).

In a preferred embodiment of the invention the base 53 is a magnesium alloy casting, and the display housing 55, top cover 57, rear cover 59 and leg 63 are also separate magnesium alloy castings.

The hinge assembly 61 also comprises magnesium alloy castings (as will be described in greater detail below).

With continued reference to FIG. 1, the computer 51 comprises a keyboard indicated generally by the reference numeral 71. The keyboard 71 comprises individual keys 73 and a keyboard cover 75.

TROUGH

Figure 2:
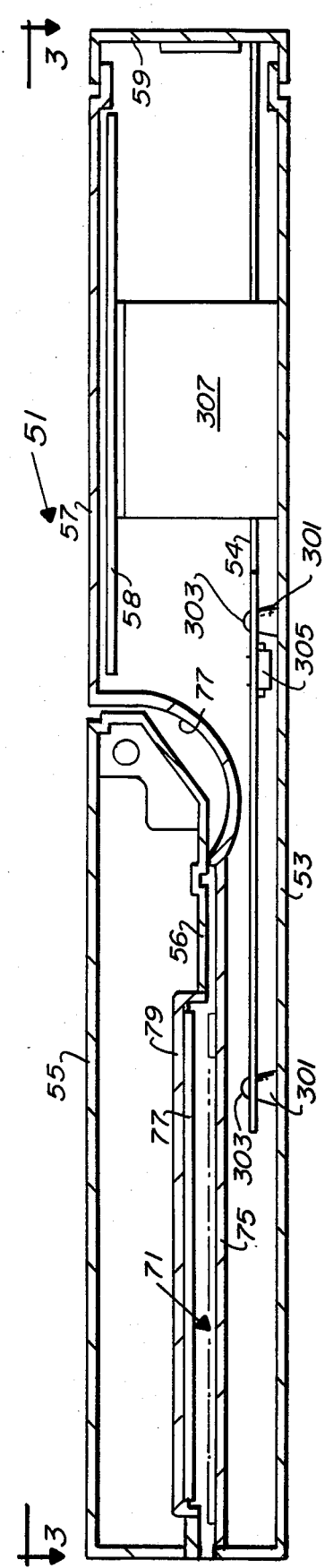
FIG. 2 is a side elevation view like FIG. 1 but showing the computer from the right hand side in the closed, transportable position with the display and the leg folded up.

As best illustrated in FIG. 2, the keyboard cover is a continuous member that not only goes around the individual keys but also forms a trough 77 at the back end of the plastic member 75. This trough 77 acts in association with the top cover 57 to enclose the rear part of the computer 51 to prevent any objects, such as pencils, paper clips and the like from entering into the electrical part of the computer. This will be described in more detail below in connection with the description of the construction of the hinge assemblies 61 for routing the cables associated with the display through channels in the hinge assemblies 61.

As best illustrated in FIG. 7 the display housing 55 mounts a display 77. A display interface board 79 is mounted underneath the display 77.

CABLES

Two cables 81 and 83 are connected to the display board 79 and are conducted out of the display housing 55 through the hinge assemblies 61. The construction of the hinge assembly 61, and a plastic bearing assembly 85 associated with each cable, will be described in more detail below.

REAR COVER

Figure 4:
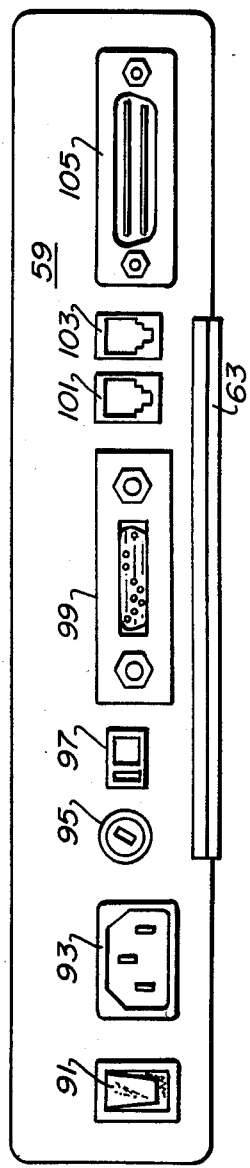
FIG. 4 is a rear elevation view taken along the line and in the direction indicated by the arrows 4—4 in FIG. 1.

FIG. 4 shows details of the rear cover 59.

As illustrated in FIG. 4 the rear cover 59 mounts a power on/off switch 91, a power line receptacle 93, a fuse holder 95, a voltage selector switch 97, a compact nineteen pin serial connector 99, a connection 101 to a telephone line, a connection 103 for a handset, and a general purpose interface bus (GPIB) connector 105 as defined in the IEEE 488-1978 specification.

FIG. 8 is a block diagram of the electrical components of the computer 51.

DISPLAY

As shown in FIGS. 7 and 8, the computer 51 comprises a graphic display which includes the display 77 and the display electronic board 79. The display includes the glass screen and driver chips 80 connected to the screen by a flexible circuit.

In the preferred embodiment of the invention the display 77 is an electroluminescent display which provides a high resolution compact display screen.

KEYBOARD

The keyboard 71 is controlled by a keyboard control 107.

The keyboard 71 provides for operator input to the computer and the graphic display provides for computer output to the operator.

The keyboard and the display provide interactive communications with the computer 51 (as well as remote attached computer systems).

With the computer 51 of the present invention there are two basic types of interfaces to the computer—one is the human oriented interface and the other is a machine oriented interface.

The human oriented interface includes, as noted above, the keyboard 71 and the display 77. The human oriented interface can also include a handset 109 for voice communication.

The machine oriented interface of the present invention includes an IEEE 488 interface associated with the GPIB interface connector 105 (see also FIG. 4), the serial communications connector 99, the telephone interface modem 101, and the accoustic coupler 103.

CENTRAL PROCESSING UNIT (CPU)

As illustrated in FIG. 8, the electrical part of the computer 51 comprises a microprocessor set 115. The microprocessor set 115 provides a central processing unit (CPU). The microprocessor set 115 comprises three processors. In one specific embodiment of the invention the microprocessor 115 includes an Intel 8086 microprocessor, an 8087 numeric processor and an 80130 interrupt controller, timer and ROM.

The microprocessor set 115 basically controls and manages the other elements within the block diagram shown in FIG. 8.

The interface between the microprocessor set 115 and the other elements of the block diagram shown in FIG. 8 comprises a set of address latches 117, a set of data buffers 119 and bus control logic 121.

A 15 megahertz oscillator 123 provides the basis for synchronous operation of the entire system.

As illustrated in FIG. 8 the 15 megahertz oscillator is a basic component in a system clock generator system which includes a system clock 125.

A 7.5 megahertz video clock 127 is derived from the 15 megahertz oscillator 123 as illustrated in FIG. 8. Both the 15 megahertz clock output and the 7.5 megahertz clock output are fed into a memory and display timing and control 129 by the respective lines 131 and 133.

The control 129 provides the control of the read/write memory 135 and the graphic display 77-79 through the connectors 137 and 139.

MEMORY

The conductor 137 forms a part of the cables 81 and 83 shown in FIG. 7.

The electrical system shown in FIG. 8 includes a read-only memory (ROM) 141 and a bubble memory 143.

The electrical system also includes a real time clock 145, a machine identification EAROM 147, a modem 149 and parallel interface logic 151 which forms a part of the modem 149.

The electrical system includes a serial communications interface 153 and its associated control logic 155.

A GPIB interface 157 has DMA control logic 159 associated with that interface. The GPIB interface includes a physical connector and a set of rules which is called the IEEE-488-1978 standard, and this set of rules is a part of the connector.

BUSES

There are three main buses tying the system together. These three main buses are an address bus 161, a 16 bit data bus 163 (comprising a high data bus 165 and a low data bus 167) and a control bus 169.

The numbers indicated by a slash mark on the lines in the various figures of the drawings indicate the physical number of conductors in that line.

POWER SUPPLY

Finally, with reference to FIG. 8, the electrical system includes a power supply 171.

The power supply 171 (not shown in FIG. 4) is associated with the on/off switch 91, the power line receptacle 93, the fuse 95 and the voltage selector switch 97 as shown in FIG. 4.

FIG. 9 shows details of the memory and display timing and control 129 of the FIG. 8 block diagram.

As illustrated in FIG. 9 the control 129 comprises a horizontal timing generator 173, a vertical timing generator 175, a display address generator 177, a state machine 191, a multiplexor 183, a dynamic RAM array 135 and a latch and shift register 187. The signals put out by and inputted into these component parts are indicated by the legend on the associated lines in FIG. 9.

ACCESS TO THE READ/WRITE MEMORY

As illustrated in the block diagram in FIG. 8 both the microprocessor set 115 and the graphic display 77, 79 access the read/write memory 135, and the accesses to this memory are controlled by the control 129.

The graphic display 77 (and associated display interface board 79) has a periodic requirement for data that will be presented on the graphic display. In a specific embodiment of the present invention this requirement is basically sixteen bits of information every 2.4 microseconds.

The present invention provides for arbitration of the dual access of the memory 135 by the graphic display and the microprocessor set in a way that provides the required noninterruptable access of the graphic display while providing minimum disruption of the microprocessor set. The present invention also provides another benefit of providing the dynamic RAM refresh which is required for proper operation of the RAM array 135.

The state machine 191 (see FIG. 9) provides the control of the arbitration noted above.

FIG. 10 shows the state transitions for the state machine 191.

Referring to FIG. 10, the first state machine 191 is an idle state, state 0000, as shown in FIG. 10 in the lower lefthand corner of the diagram. In this idle state the state machine 191 sits until either one of two things happens. The state machine 191 will transition to state 0001 if there is a CPU request on the lines 193 as shown in FIG. 9.

The state machine can, alternatively, transition to state 1000 on a display request received on the input lines 195 shown in FIG. 9.

If the state machine 191 receives simultaneous requests on the lines 193 and 195, then the transition will be from the state 0000 to the state 1000. This occurs because the state machine 191 is biased to give priority to the display.

Once the state machine starts the transition to a specific second state (the state 0001 or the state 1000 as described above), the state machine continues to change state sequentially without condition as illustrated in FIG. 10, except when the state machine 191 reaches state 0101 (shown in the top lefthand side of FIG. 10). The state machine 191 stays in state 0101 until the microprocessor set selection signals (on the lines 193) become inactive, at which point the state machine 191 proceeds to 0110 and then back to the idle state without condition.

In a particular implementation of the present invention the state machine 191 is comprised of a four bit counter and a logic array which is a collection of gates and four flip-flops connected to perform the state transitions as shown in FIG. 10.

In a particular embodiment of the present invention the state machine 191 acts in conjunction with a FIFO in the Intel Model 8086 microprocessor and the latches and shift register 187, to provide the desired elasticity of access by the CPU to the memory 135 which effects the efficiency of performance of the CPU.

NINETEEN PIN CONNECTOR

The serial communications interface 153 and the control logic 155 as shown in FIG. 11 permit a compact nineteen pin connector to support both a high speed balanced serial link and a low speed unbalanced serial link with versatile clock switching depending upon the mode to which the logic array 155 is switched.

As shown in FIG. 12 the logic array 155 comprises a multiplexor which is under the control of the CPU by means of the signals 201, and it receives different clock inputs from external pins on the nineteen pin connector on the lines 203, and it receives a clock signal on a line 205 from an internal clock source.

The multiplexor 155 provides clock switching to the serial controller on the line 207 and to one of the pins on the nineteen pin connector on the line 209. The multiplexor 155 also controls the driver enable in the high speed balanced mode by means of an output on a line 211.

It should be noted with reference to FIG. 11 that the pin numbers for the various pins of the nineteen pin connector are those numbers which are directly opposite the pins in the tabular listing on the right hand side of FIG. 11.

The lower part of FIG. 12 contains a tabular desscription of what the output lines 207, 209 and 211 do with reference to different combinations of select bits received on the input lines 201, 203 and 205.

The serial communications controller 153 and logic array 155 illustrated in FIGS. 11 and 12 and described above thus enable a very compact nineteen pin connector to be used in two different modes of operation.

DATA TRANSFER THROUGH GPIB INTERFACE

The purpose of the circuitry shown in FIG. 13 (and in related FIGS. 14 and 15) is to maximize the rate of data transfer through the GPIB interface 157 (associated with the connector 105 as shown in FIG. 4). The data is transferred both into and out of the GPIB interface in the operation of the computer 51.

A general problem with the rate of transfer of data involves the number of operations that have to be performed in determining, first of all, the validity of the presence of data, then the acquisition of the data and the storage of the data, updating the various pointers and counters and determining whether or not the acquisition process should be continued or terminated. Typically, the problem has been solved with relatively large, extensive use of discreet logic.

The present invention optimizes particular capabilities of the 8086 microprocessor and the GPIB interface to allow for fast data transfer without the use of extensive logic. The present invention accomplishes this by using the combination of an instruction in the 8086 and a capability of a GPIB interface device as will now be described.

The components of FIG. 13 which correspond to the same components in the FIG. 8 block diagram are indicated by the same reference numerals, but it should be noted that the data buffer 119 of FIG. 8 is shown as a three-part data bus buffer having the parts 119A, 119B and 119C in FIG. 13.

The instruction that is used on the 8086 microprocessor in the present invention can very rapidly move strings of data from one memory location to another.

The bus buffers 119A and 119B serve to take pieces of data moved by the 8086 and to sequentially give that data to the GPIB interface 157.

The GPIB interface 157 indicates its readiness to accept data on the DMA request line 213. The DMA grant line 215 is used to indicate the availability of that data from the 8086 to the GPIB interface.

The microprocessor 115 indicates the availability of data for the interface 157 on the DMA cycle select line 217 and the DMA control logic 159 (which in a particular embodiment of the invention uses part of the mechanism of the multiprocessor) indicates the acceptance of the data by the GPIB interface 157 on the CPU wait/-signal line 219.

In the event of interruption in the GPIB interface transfer, processor operation would halt because the GPIB interface would not be able to receive any more data. In this event the DMA control logic 159 would not allow the processor 115 to continue operation.

The keyboard microcomputer controller 107 maintains a watchdog timer which, if not periodically reset, will activate the DMA time-out line 221. This activation of the line 221 causes the DMA control logic 159 to allow the 8086 to continue normal operation.

Secondarily, the keyboard microcomputer controller generates an interrupt signal to the CPU 115 on the line informing the microprocessor of the watchdog time-out.

FIG. 14 shows the state conditions of the DMA control logic 159 starting with the idle state 0000 at the bottom of FIG. 14.

The CPU 115 generates an address latch enable (ALE) signal that indicates the startup of the instruction sequence.

If the CPU 115 is doing a DMA cycle and the keyboard 107 has not timed out on the line 221, and if the GPIB interface has not signalled its readiness to accept data on line 213, then the state machine 191 remains in state zero, and the CPU 115 is caused to wait by the signal on line 219.

When the GPIB interface 157 signals its readiness to accept data on line 213, or if there is a keyboard time-out on line 221, then the state machine 191 is allowed to proceed to state one (0001 as illustrated in FIG. 14). The state machine then proceeds through the remaining states indicated in sequence without further qualification.

The state machine returns to the idle state by the start of the next instruction cycle.

The DMA control logic 159 (see FIG. 13) in conjunction with the read/write control signal on the line 225 control the direction of the data bus buffers 119A-119C.

The DMA control logic 159 combines signals from the CPU control signal line 227 and CPU addresses on line 217 to appropriately enable buffers 119A, 119B or 119C.

EAROM

With reference to FIG. 15, the machine identification EAROM is an electrically alterable read only memory.

The purpose of the EAROM 147 is to give each individual computer 51 a unique machine readable identification number that is not readily altered by the user, but that can be easily changed by the manufacturer without physical removal and replacement of the EAROM 147.

As illustrated in FIG. 15, the EAROM 147 has input signal lines 229, 231 and 233. The lines 229 are subsets of the buses 161 and 169. The line 231 is also a subset of 169.

The EAROM 147 has a bidirectional bus 235 which is a subset of the bus 163 shown in FIG. 8.

A line 237 is connected to a pin labeled "store" at the bottom of the EAROM 147 as illustrated in FIG. 15.

A line 239 is operatively associated with the line 237.

A store signal from a test fixture is transmitted on a line 239, and this store signal is jumpered to the line 237 by a jumper or other connector 247.

A jumper 241 can be connected to the test points 243 and 245 and the line 239 to allow alteration of information in the machine EAROM 147. The jumpers 241 and 247 and the line 239 are mounted external to the computer 51, and are used with a program for altering the information stored in the EAROM 147. The information stored in the EAROM 147 cannot be changed without connecting the jumper 241 across the contacts 243 and 245 and without engaging the line 239 with the line 237 via jumper 247.

A combination of the jumpers 241 and 247 with programs executing in machine 51 as well as the test fixture allow alteration of information stored in the EAROM 147.

PARALLEL MODEM INTERFACE

FIG. 16 shows how the interface logic 151 is associated with the modem 149 and the CPU 115.

As illustrated in FIG. 16 the parallel interface logic 151 has a bidirectional data bus 167 and has a number of conductors which form a subset of the buses 161 and 169 shown in FIG. 8 and which transmit the signals indicated by the legends on these lines in FIG. 16.

The parallel interface logic 151 of the present invention enables the CPU 115 to communicate with the modem 149 more efficiently than present serial interface modems. This interface logic permits the parallel transfer of data and control to the modem for faster transfer.

As illustrated in FIG. 17 the parallel interface logic comprises a separate item of hardware (a programmable interface adapter) which is constructed to receive the specific signals on the lines as indicated by the legends in FIG. 17 and which is also constructed to receive and transmit the respective signals indicated by the legends on the lefthand side of FIG. 17 and which is also constructed to transmit to the tone dialer in the modem and to receive from the modem microcomputer the specific signals indicated by the legends on the righthand side of the adapter 151 as shown in FIG. 17.

The programmable interface adapter 151 as shown in FIG. 17 permits a parallel interface to be matched to another parallel interface without the interposition of a first parallel to serial converter and then a second serial to parallel converter as has been done in the prior art. The present invention utilizes the programmable interface adapter 151 to go directly from one parallel interface to another parallel interface.

HANDSET OR ACOUSTIC COUPLER

FIG. 18 is a diagram illustrating the electrical connections and related circuit components incorporated in the computer 51 which enable the computer 51 to be used with either a handset 109 or an accoustic coupler 113 to transmit voice or data.

In accordance with the present invention, the computer 51 comprises a connector 103 and the switching logic shown in FIG. 18. A multiplexor 249 is associated as illustrated with connections for a handset or accoustic coupler in the connector 103.

The multiplexor 249 is switched under program control of the CPU 115 by the select signal on a line 251 coming from the programmable interface adapter 151 (FIG. 17).

MAIN LOGIC BOARD

With reference now to FIG. 5, the base 53 is shown in FIG. 5 without the rear cover 59 in place to simplify the illustration of how the main logic board 54 fits within the base 53.

As illustrated in FIG. 5, the main logic board is mounted on the base 53 by threaded bosses 301 (see FIG. 2) and pan-head screws 303 (see FIG. 2).

All of the electrical components of the logic board (with the exception of the bubble memory 143 and associated connectors) are mounted on the lower side of the logic board 54. Thus, as illustrated by the phantom outline in FIG. 5, the IC's 305 are mounted on the underside of the logic board 54. As will be described in greater detail below, these IC's are positioned close to the inner surface of the base 53 to conduct heat from the IC's by both radiation and conduction.

As illustrated in FIG. 5, a lower flange of a leaf spring 307 forming part of a heat sink assembly for the power supply 56 (see FIG. 2) is mounted on the base near the upper lefthand corner portion of the logic board 54 (as viewed in FIG. 5).

As also shown in FIG. 5, the base 53 has two openings 309 for receiving a nose 311 (see FIG. 28) of the leg 63 (see FIGS. 1 and 28), as will be described in more detail below.

LATCH MECHANISM

As also shown in FIG. 5, the base 53 has bosses which form supports for the lower, fixed latch piece 69 (see FIG. 1 and FIG. 24). The construction and operation of the latch mechanism 71 will be described in more detail below.

For general reference and orientation, several keys 73 of the keyboard have been shown in phantom outline in FIG. 5.

As illustrated in FIGS. 1, 2 and 26, the display frame 56 covers the display electronics and delineates the display 77.

KEYBOARD FRAME COVER

With reference now to FIGS. 24 and 25, the structure for assembling and holding the keyboard frame cover 75 in place will now be described.

As shown in FIG. 24, the keyboard cover 75 has two snap details under the front lip 315. These are the snap details 317.

The keyboard frame cover 75 also has a boss 319 on each side near the side edge.

As illustrated in FIG. 24, the base 53 has a ledge which has a lower, machined surface for engaging the snap detail 317.

The lower latch piece or pocket 69, which is attached to the base 53 by the pan-head screws 323, has a pair of cantilevered spring elements 325 which are integral to the lower latch piece 69 and which are constructed to engage into the boss 319.

As best illustrated in FIG. 25, the boss 319 has a lower circular surface, and the cantilevered spring elements 325 have an upper surface 327 inclined at an angle from the vertical and a second inclined surface 331 which is inclined at an angle 333 from the vertical. The angle 329 is a lesser angle than the angle 333 and permits relatively easy entry of the boss 319 into and between the spring elements 325, and the angle 333 then serves to hold the keyboard frame cover 75 in place. However, the surface 331 and the angle 333 are selected so that the boss 319 can be withdrawn from between the spring elements 325 without destroying any of the details.

The hook and snap structure and mode of assembly for the keyboard frame assembly 75 permits the keyboard cover to be snapped into place and then held securely in place without the need for screws or other fasteners.

DISPLAY FRAME COVER

With reference now to FIG. 26, the display frame cover 56 has two snap details 335 which coact with a machined surface on the underside of the ledge 337 of the display housing 55 similar to the coaction between the parts 317 and 321 in FIG. 24. The display frame cover 57 also has two bosses 339 which snap into cantilever spring members similar to the way that the boss 319 snaps into place between the spring members 325 in FIG. 25.

In addition, the display cover 56 is held in position by a stop pin 343 which forms a part of the hinge assembly 61 (see FIGS. 1 and 22).

As illustrated in the detailed view of FIG. 27, the stop pin 343 is screwed into a threaded opening of an upstanding flange 345 of the display housing 55, and the shank portion of the stop pin 343 projects through an opening in a depending flange 349 formed on the underside of the display frame cover 56.

The display frame cover 56 is thus held in place by the stop pins 343, the bosses 339 and the hooks 335. The display frame 56 is snapped into position in the same way as described above with reference to the keyboard frame cover 75, but the stop pin 343 also serves to retain the display frame cover 56 in place in the display housing 55.

The stop pin 343 used with the display frame cover 56 provides the safety feature of preventing inadvertent removal of the display frame cover 56, and this is important because of the electrical circuitry beneath the display frame cover 56.

The stop pins 343 thus provide a dual function of stopping the tilting of the display frame at the proper angle (as described in more detail below) and retaining the display frame cover 56 in position.

LEG

Details of the construction and operation of the leg 63 are shown in FIG. 28.

In FIG. 28, the leg 63 is shown in its retracted position in the phantom outline. This is the position of the leg as shown in FIG. 2.

When the computer 51 is opened for use as shown in FIG. 1, the leg 63 is rotated to the extended position as shown in FIG. 1 (and as shown in FIG. 28 in the bold outline).

It is important that the leg 63 be positively held in both the retracted position as shown in phantom outline and in the extended position as shown in bold outline in FIG. 28. The leaf spring 351 coacts with the movable pivot axis 353 for the leg 63 and a part of coacting inclined surfaces on the nose 311 of the leg 63 and the opening 309 in the base 53 to provide the positive positioning and retention of the leg 63 in the retracted position and the extended position as illustrated in FIG. 28.

The spring 351 has an ear or flange 355 that extends downward as illustrated in FIG. 28 and which is attached to the leg 63 by a pin 357 and which forms the axis to pivot 353 for rotation of the leg with respect to the flange 355 of the spring.

The spring exerts an upward biasing force on the leg 63 in both the retracted position shown in the phantom outline in FIG. 28 and in the extended position shown in bold outline shown in FIG. 28.

In the retracted position, as shown in more detail in FIG. 30, the nose 311 is engaged with the base 53 at a point 361, and this point 361 forms a pivot point for the leg 63. The weight of the leg 63 acting along the line 363 at the distance 365 from the pivot point 361 tends to rotate the leg downward, but the spring force acting through the axis 353 and at the distance 367 from the pivot point 361 is sufficient to retain the leg 63 in the retracted position shown in FIG. 30—until someone pulls the leg downward against the spring force at the time of moving the leg 63 to the extended position.

In the extended position of the leg 63 (as shown in bold outline in FIG. 28), the spring 351 continues to exert an upward force on the leg 63 as shown by the legend "Spring Force" in FIG. 28 and FIG. 29. In this position of the leg 63, the upward bias provided by the spring force tends to wedge an inclined surface 369 of the nose 311 against a coacting inclined surface 371 formed on the interior of the opening 309 in the base 53. These two surfaces are inclined at a slight angle 373 as shown in FIG. 29 (which in one specific embodiment of the present invention is about 5°). This inclination of the surfaces 369 and 371 is primarily to allow for the tolerances of the surfaces so as to insure that the nose 311 is pulled up to positively engage the nose 311 within the opening 309 in base 63.

As illustrated in FIG. 28, the pivot axis 353 moves between the positions shown in the bold outline and in the phantom outline during the extension and retraction of the leg 63, and the spring 351 permits this movement of the pivot axis to accommodate the repositioning of the leg 63.

The spring 351 is attached to a boss 375 on the interior of the base 53 by a pan-head screw 377 as illustrated in FIG. 28.

HINGE ASSEMBLY

FIG. 22 shows details of the structure of the hinge assembly 61 (see also FIG. 1).

The hinge assembly 61 comprises a hinge ear 379 which is a separate piece from the base and which is bolted onto the base.

As shown in FIG. 5 and FIG. 22 the base 53 has bosses 380 onto which the hinge ears 379 are bolted.

With continued reference to FIG. 22, the display housing 55 has a trunnion 381 formed integral with the display housing.

The bearing 85 (see also FIG. 7) fits on the trunnion 381 and within a race 382 formed in the hinge ear 379 to permit the relative rotation between the display housing 55 and the base 53.

As shown in the partial cross section through the hinge assembly 61 in FIG. 1, the top cover 57 has a projection 383 which fits in beneath a surface 385 in the hinge ear 379 to cause the upper, inner surface 387 of the top cover 57 to engage the upper edge of the bearing 85 and to hold the bearing and the hinge assembly in position when the top cover 57 is connected to the base 53 through the rear cover 59.

A torsion spring 391 has an outer end 393 which fits within a slot 395 in the hinge ear 379 and has an inner curved end part 397 which engages the top surface of the stop pin 343 to bias the stop pin 343 downward, as viewed in FIG. 1.

The inner end 397 of the torsion spring 391 engages the associated stop pin 343 when the display assembly 55 is in the fully latched and closed position of the computer and exerts a biasing force on the stop pin which lifts the display assembly 55 about 10° when the computer 51 is unlatched. This insures that the display assembly 55 must be latched to the base 53 before the computer 51 can be picked up and carried. It also prevents the display assembly 55 from being inadvertently slammed down onto the base 53 when the computer 51 is being closed.

As illustrated in FIG. 22, each hinge ear 379 has an inner circular channel 399 whose radius corresponds to the arc of movement of the stop pin 343 and permits this stop pin to move within the channel during opening and closing movements of the display housing 55. The channel 39 has an end surface 401 which engages the stop pin to hold the display housing 55 in the full erected position shown in FIG. 51.

It is a feature of each hinge assembly 61 of the present invention that the cable is guided through the interior of the hinge assembly and is also held in position within the hinge ear 379 in a way which gives the cable a positive place to be during the required swinging movement of the display housing 55 and also during assembly of the computer 51. This also protects the cable against snagging and unnecessary flexure.

As illustrated in FIG. 22, the hinge ear 379 has a cable channel guide 403, and the bearing 85 has a central opening 405 which aligns with a related opening 407 in the display frame 55.

The hinge assembly 61 thus provides several functions.

It provides the pivoting action required for erecting the display.

It provides the stop for holding the display at the desired angle.

It provides the torsional biasing force which insures that the case is positively locked for transporting and which prevents impact damage to the computer components on closing of the upper cover.

It also provides the cable location and guidance.

It provides the positive locking of the top cover for retaining the bearing and associated hinge components in position when assembled.

HEAT TRANSFER

It is a very important feature of the present invention that all of the heat producing components of the computer 51 are located to maximize the transfer of heat from these components to the base for dissipation to the surroundings.

These features of the present invention are illustrated in FIGS. 19-21 and FIGS. 31 and 32.

In the operation of the computer 51, most (about 80%) of the heat is generated in the base part of the computer. A small amount of heat is generated in the display part of the computer.

The heat generated in the base part of the computer is generated by the power supply and by the integrated circuit components.

The power supply components and the integrated circuit (IC) components are positioned and located in the base to maximize the transfer of heat from these components directly to the heat sink provided by the metal base, as will now be described.

As illustrated in FIG. 5, each IC 305 is mounted on the underside of the logic board 54 so that the IC 305 is positioned quite close to but not in contact with the inner surface 501 of the base 53 as illustrated in FIG. 31. In a specific embodiment of the present invention a small gap 503, as small as 0.010 inch, is provided between the IC 305 and the surface 501.

This small air gap 503 actually provides physical conduction for the heat transfer between the IC 30 and the base 53, and a substantial amount of heat is also radiated across this gap 503. Using this air gap as a vehicle for the transfer of heat by conduction and radiation actually provides a more efficient heat transfer (with air gaps of this size) than is obtained by using a leaf spring heat sink between the IC and the base 53. It was found, in theory, that this air gap was a more efficient vehicle than metal clips.

The present invention provides highly efficient dissipation of heat. By having the heat producing components located quite close to the metal base 53, there is a highly efficient transfer of heat by radiation and conduction from each individual component to the metal base 53.

FIGS. 19-21 illustrate details of the structure for maximizing the transfer of the heat from the power supply to the heat sink provided by the base 53.

As illustrated in FIGS. 19 and 20, the power supply components represented by the block numbered 171 (see FIG. 8) are mounted on a power supply board 58 (see also FIG. 2). The components of the power supply 171 are mounted on the underside of the power supply board 58.

As illustrated in FIG. 20 a metal bracket 505 is connected directly to the power supply board 58, by soldering or the like; and certain high heat producing components of the power supply, such as the transistors 507, are mounted on the metal bracket 505. The leaf spring 307 is in turn connected, as by riveting, to the metal bracket 505; and the flanged lower end of the leaf spring 307 engages the base 53. In a preferred embodiment of the present invention a thermally conducting compound 509 is used between the lower end of the leaf spring 307 and the base 53 to maximize the transfer of heat.

In the heat transfer for the power supply 171, the heat sink spring 307 serves as the primary vehicle for transferring the heat from the primary heat producing components 507 of the power supply 171 to the outer base 53.

In a preferred embodiment of the present invention, the base 53 and other components of the outer case of the computer 51 are made of cast magnesium. Magnesium was chosen as a preferred metal for the cover because of the lightness of magnesium and because magnesium provides adequate heat transfer properties and characteristics.

LATCH ASSEMBLY

The latch assembly comprising the sliding latch piece 67 mounted on the upper, display housing 55 and the fixed latch piece 69 mounted on the base 53 (see FIG. 1) will now be described with specific reference to FIG. 23.

This latch mechanism incorporates a spring-loaded cam action which permits the display housing to be latched to the base automatically by pressing these two components together. It also provides a mechanism which is recessed within the display housing and the base in a way to minimize the chance of inadvertent and unwanted unlatching of the display housing.

FIG. 23 shows the computer 51 with the display housing 55 held open by the torsion spring.

As illustrated by the block arrow 511 in FIG. 23, the display housing 55 moves toward the base 53 in the final closing and away from the base 53 in the initial opening.

The top slider 67 of the latch assembly is mounted within a recessed opening 513 (see FIG. 33), and a spring 515 has one end engaged with a surface 517 formed on the interior of the housing 55 and has another end engaged with a surface 519 formed on the interior of the slider 67 (as best shown in FIGS. 33 and 34). The slider 67 moves forward against the force of the spring 515 by virtue of a camming surface 521 sliding against a lower latch pusher surface 523 on the fixed lower latch piece 69.

As illustrated in FIG. 33, swinging movement of the housing 55 downward causes the surface 521 to engage the surface 523 and to progressively move the slider 67 to the left (as viewed in FIG. 33) in the direction of the block arrow 524. When the display housing 55 is fully closed down onto the base 53, the spring 515 retracts the slider 67 to the position illustrated in FIG. 34 where an inclined surface 529 engages a coacting inclined surface 527 on the fixed lower latch piece 69. The taper and wedging action provided between these inclined surfaces provides a ramp which compensates for parts tolerances to prevent looseness between these two latch pieces and to prevent resulting rattling of the display housing 55 with respect to the base 53 in the latched, closed position. That is, the spring 515 pushes the slider 67 backwards, (to the right as indicated by the block arrow 524 as viewed in FIG. 34) until the two ramps engage in positive contact.

If the surfaces 525 and 527 were not ramps as shown (but were instead flat, horizontal surfaces), part tolerances could result in rattling.

The latch assembly is opened by pushing forward on the slider 67.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A portable computer constructed to be contained within an outer case for transport and to be erectable to a viewing and operating configuration for use, said computer comprising
    a base,
    a display housing,
    a top cover,
    a rear cover,
    hinge means for permitting swinging movement display housing about an axis of rotation adjacent the rear end of the dispaly housing and from a closed and latched position of the display housing on the base to an erected position for viewing by an operator, and including stop means for holding the display housing at the desired angle for viewing,
    the hinge means being located in a mid portion of the base and wherein the hinge means permit swinging movement of the display housing to an erected position in which the inner surface of the display housing is held in an upward and rearwardly inclined angle for viewing by an operator in front of the computer, and
    including a keyboard in the portion of the base which is exposed by the movement of the display housing to the erected position.

2. The invention defined in claim 1 including torsion spring means for biasing the display housing upward from the latched position and effective to prevent slamming of the display housing onto the base as the display housing is moved toward the closed and latched position.

3. The invention defined in claim 1 wherein the hinge means include hinge ears which are attached to the base and trunnions on the display housing, and including bearing means engageable with the hinge ears and the trunnions.

4. The invention defined in claim 1 including cable guide means operatively associated with the hinge means for guiding a cable associated with the display of the display housing through the center of the hinge means to protect the cable against snagging and unnecessary flexure during the required swinging movement of the display housing on the base.

5. The invention defined in claim 1 wherein the display housing includes a display and display frame cover means, and wherein the display frame cover means include ledge and snap means for permitting the display frame cover to be snapped into and out of the display housing.

6. The invention defined in claim 1 including latch means for latching the display housing to the base in the closed condition of the computer, the latch means including a fixed latch piece mounted on the base and a sliding latch piece mounted on the display housing, the latch means being recessed within the display housing and the base to minimize the chance of inadvertent and unwanted unlatching of the display housing.

7. The invention defined in claim 1 including leg means rotatable from a retracted position against the base of the computer in the closed position of the computer to an extended position in the erected an operating configuration of the computer, the leg means including movable pivot means and spring means for permitting the leg to be positively held in both the retracted position and the extended position.

8. The invention defined in claim 1 including fastener means for causing the rear cover to lock the top cover to the base, and wherein the rear cover mounts a serial connector means, a general purpose interface bus connector means, a telephone connection means for a telephone line and a handset connection means for a handset or acoustic coupler.

9. The invention defined in claim 1 wherein the display housing includes and electroluminescent display, and including a display interface board mounted in the dispaly housing underneath the display.

10. The invention defined in claim 9 including cable means connected to the display interface board and cable conduit means for conducting the cable means through a central part of the hinge means and into the base.

11. The invention defined in claim 1 wherein the base is metal and including logic board means in the base and power supply board means mounted in the base to use the metal base as a heat sink for dissipating the heat produced by the major heat producing components of the electrical circuitry located in the base.

12. The invention defined in claim 11 wherein the logic board means include integrated circuit means mounted on the side of the board facing the inner surface of the base and wherein the integrated circuit means are spaced from the inner surface of the base by an air gap sufficiently small to cause a highly efficient transfer of heat by radiation and conduction from each individual component of the integrated circuit means to the metal base through the air gap.

13. A portable computer constructed to be contained within an outer case for transport and to be erectable to a viewing and operating configuration for use, said computer comprising a base, a display housing, a top cover, a rear cover, hinge means for permitting swinging movement of the display housing about an axis of rotation adjacent the rear end of the display housing and from a closed and latched position of the display housing on the base to an erected position for viewing by an operator, and wherein the dispaly housing includes a display and display frame cover means, and the dispaly frame cover means include ledge and snap means for permitting the display frame cover to be snapped into and out of the display housing, and the hinge means include stop pin means for holding the display housing at the desired angle in the erected position and the display frame cover means include openings coacting with the stop pin means for retaining the dispaly frame cover means in place and for preventing inadvertent removal of the display frame cover means.

14. A portable computer constructed to be contained within an outer case for transport and to be erectable to a viewing and operating configuration for use, said computer comprising a base, a display housing, a top cover, a rear cover, hinge means for permitting swinging movement of the display housing about an axis of rotation adjacent the rear end of the display housing and from a closed and latched position of the display housing on the base to an erected position for viewing by an operator, and latch means for latching the display housing to the base in the closed condition of the computer, and wherein the latch means include a fixed latch piece mounted on the base and a sliding latch piece mounted on the display housing, and wherein each latch piece has an inclined surface engageable with the inclined surface of the other latch piece and wherein the inclinations of the inclined surfaces provide a taper and wedging action which compensates for parts tolerances to prevent looseness between these two latch pieces and to prevent resultant rattling of the display housing with respect to the base in the latched, closed position.

15. A portable computer constructed to be contained within an outer case for transport and to be erectable to a viewing and operating configuration for use, said computer comprising a base, a display housing, a top cover, a rear cover, hinge means for permitting swinging movement of the display housing about an axis of rotation adjacent the rear end of the display housing and from a closed and latched position of the display housing on the base to an erected position for viewing by an operator, leg means rotatable from a retracted position against the base of the computer in the closed position of the computer to an extended position in the erected and operating configuration of the computer, wherein the leg means include movable pivot means and spring means for permitting the leg to be positively held in both the retracted position and the extended position, and wherein the leg means include a nose which fits within a related opening in the base in the extended position, and wherein the nose and the opening in the base have coacting, inclined surface which allow for part tolerances so as to insure that the nose is pulled up by the spring means to positively engage the nose within the opening in the base.

16. A portable computer constructed to be contained within an outer case for transport and to be erectable to a viewing and operating configuration for use, said computer comprising a base, a display housing, a top cover, a rear cover, hinge means for permitting swining movement of the display housing about an axis of rotation adjacent the rear end of the display housing and from a closed and latched position of the dispaly housing on the base to an erected position for viewing by an operator, and wherein the base is metal and including logic board means in the base and power supply board means mounted in the base to use the metal base as a heat sink for dissipating the heat produced by the major heat producting components of the electrical circuitry located in the base, and the power supply board means include power supply components mounted on the underside of the power supply board, a metal bracket, and a leaf spring engaging the metal base and wherein the power supply components transfer the heat to the metal base through the metal bracket and the leaf spring.

17. The invention defined in claim 16 including thermally conducting compound means between the lower end of the leaf spring and the metal base for maximizing the transfer of heat.

18. A portable computer having a compact closed configuration for transport and having an open configuration wherein a display swings out for viewing for use of the computer, comprising:

a base having a front, a rear, an upper side and a bottom, a keyboard mounted on the upper side of the base and adjacent to the front of the base, a display housing with a display, the display housing being pivotally mounted on the base from a rear end of the display housing on a horizontal pivot axis in a mid portion of the base, such that in a closed position the display housing covers the keyboard and in an open position the display housing is pivoted back to expose the keyboard, with the dispaly mounted in the housing such that it is in convenient view to an operator in front of the keyboard, and stop means for holding the display housing and dispaly at an open position rearwardly inclined with respect to the base and convenient for view, whereby the display is close to the keyboard and to the user in the open position of the computer, and the display housing enclosed and protects the keyboard in the closed position of the computer.

19. The portable computer of claim 18, further including a pivotal leg in the bottom of the base and toward the rear, with leg mounting means connecting the leg to the base such that in a retracted position the leg is retained against and contained within the base without projecting outwardly significantly from the bottom of the base, and in an extended position the leg projects outwardly and downwardly to support and elevate the rear of the base so that the base is inclined at an appropriate angle for convenient use of the keyboard and the display.

* * * * *

UNITED STATES PATENT AND TRADEMARK OFFICE
CERTIFICATE OF CORRECTION

PATENT NO. : 4,571,456
DATED : February 18, 1986
INVENTOR(S) : David C. Paulsen et al It is certified that error appears in the above—identified patent and that said Letters Patent is hereby corrected as shown below:

Column 2, lines 15 and 16, "display covering" should read -- display housing while covering -- .

Column 2, line 68 and column 3, line 1, "unbalanced versatile clock should read -- unbalanced serial link with versatile clock -- .

Column 4, line 16, after "logic" add -- in Fig. 8 -- .

Column 5, line 63, "cover is" should read -- cover 75 is -- .

Column 7, line 14, "oscillator is" should read -- oscillator 123 is -- .

Column 10, lines 22 and 23, "line informing" should read -- line 223 informing -- .

Column 10, line 32, "interface has" should read --interface 157 has -- .

Column 11, lines 36 and 37, "logic comprises" should read -- logic 151 comprises -- .

Column 12, line 9, "board is" should read -- board 54 is -- .

Column 12, line 23, "base near" should read -- base 53 near --

Column 12, line 32, "bosses which" should read -- bosses 312 which -- .

Column 12, lines 53 and 54, "ledge which" should read -- ledge 321 which -- .

UNITED STATES PATENT AND TRADEMARK OFFICE
CERTIFICATE OF CORRECTION

PATENT NO. : 4,571,456

DATED : February 18, 1986

INVENTOR(S) : David C. Paulsen et al

It is certified that error appears in the above—identified patent and that said Letters Patent is hereby corrected as shown below:

Column 12, lines 63 and 64, "angle from" should read -- angle 329 from -- .

Column 13, line 18, "members similar" should read -- members 341 similar -- .

Column 13, line 28, "opening in" should read -- opening 347 in --

Column 17, line 58, "movement display" should read -- movement of the display -- .

Column 20, line 21, "inclined surface" should read -- inclined surfaces -- .

Column 21, lines 6 and 7 "and disp-aly" should read -- and display -- .

Column 21, line 11 "housing enclosed" should read -- housing encloses -- .

Signed and Sealed this

Tenth Day of June 1986

[SEAL]

Attest:

DONALD J. QUIGG

Attesting Officer     Commissioner of Patents and Trademarks

REEXAMINATION CERTIFICATE (2652nd)
United States Patent [19]
Paulsen et al.

[11] B1 4,571,456

[45] Certificate Issued Aug. 15, 1995

[54] PORTABLE COMPUTER

[75] Inventors: David C. Paulsen, Santa Clara; Glenn T. Edens, Menlo Park; Karl S. Nakamura, Santa Clara; David M. Gallatin, San Jose; Stephen R. Hobson; William G. Moggridge, both of Palo Alto, all of Calif.

[73] Assignee: Grid Systems Corporation, Mountain View, Calif.

Reexamination Requests:
No. 90/002,014, Apr. 27, 1990
No. 90/002,053, Jun. 12, 1990
No. 90/002,179, Oct. 22, 1990

Reexamination Certificate for:
Patent No.: 4,571,456
Issued: Feb. 18, 1986
Appl. No.: 435,126
Filed: Oct. 18, 1992

Certificate of Correction issued Jun. 10, 1986.

[51] Int. Cl.⁶ .................. H04M 11/00; G09G 1/00; A47B 88/00
[52] U.S. Cl. ..................... 379/96; 248/455; 312/327; 345/87; 345/168; 361/680; 361/687; 364/708.1; 379/99
[58] Field of Search .............. 379/96, 99; D14/100, D14/102, 106, 113–115; 49/167, 386, 394, 395; 248/455; 312/208, 236, 294, 317.1, 319, 327, 328; 340/700, 784; 361/383, 386, 389, 399; 364/708

[56] References Cited

U.S. PATENT DOCUMENTS

| | | | |
|---|---|---|---|
| D. 206,716 | 1/1967 | Rossi . | |
| D. 247,563 | 3/1978 | Jimbo et al. | D14/106 |
| D. 250,588 | 12/1978 | Mayer et al. | D14/106 |
| D. 254,005 | 1/1980 | Reid et al. | D14/106 |
| D. 275,102 | 8/1984 | MacConnell . | |
| 402,324 | 4/1889 | Hertel | 16/308 |
| 3,311,213 | 3/1967 | Amos | 400/648 |
| 3,488,667 | 1/1970 | Gutshall | 16/341 X |
| 3,631,325 | 12/1971 | Wenz | 361/387 |
| 3,730,378 | 5/1973 | Celbinson et al. | 312/328 X |
| 3,875,625 | 12/1974 | Crane et al. . | |
| 4,040,776 | 1/1978 | Mitsuhashi | 40/381 |
| 4,068,095 | 1/1978 | Ghormley et al. | 379/444 |
| 4,084,213 | 4/1978 | Kirchner et al. | 361/384 |
| 4,140,357 | 2/1979 | Wolz et al. . | |
| 4,158,271 | 6/1979 | Barry | 49/386 |
| 4,159,417 | 6/1979 | Rubincam | 235/375 |
| 4,170,772 | 10/1979 | Bly | 340/781 |
| 4,206,559 | 6/1980 | Brown | 40/361 |
| 4,223,787 | 9/1980 | Lowry et al. | 206/387 |
| 4,227,283 | 10/1980 | Mathewsen et al. | 16/257 |
| 4,263,594 | 4/1981 | Masucci | 340/795 |
| 4,268,721 | 5/1981 | Nielson et al. | 379/52 |
| 4,291,198 | 9/1981 | Anderson et al. | 379/96 |
| 4,294,496 | 10/1981 | Murez | 312/208 |
| 4,367,374 | 1/1983 | Serrano | 379/442 |
| 4,409,641 | 10/1983 | Jakob et al. | 361/386 |
| 4,429,305 | 1/1984 | Hosokawa et al. | 340/784 |

FOREIGN PATENT DOCUMENTS

| | | |
|---|---|---|
| 47-14961 | 5/1972 | Japan . |
| 48-39804 | 5/1973 | Japan . |
| 48-69585 | 5/1973 | Japan . |
| 50-5515 | 1/1975 | Japan . |
| 54-101550 | 2/1981 | Japan . |
| 60-25618 | 8/1985 | Japan . |

OTHER PUBLICATIONS

Radio Shack Catalog No. 328, copyright 1980, pp. 166, 175.

IBM, "A Data Processing Glossary", 1969, pp. 8 and 12.

Radio Shack Catlaog No. 341, copyright 1981, pp. 154, 168.

Encyclopedia ASC II.

BYTE, The Small Systems Journal, Jan. 1981, vol. 6, No. 1, p. 202, A McGraw-Hill Publication.

"Computer Compatible Electrolumninescent Techniques for the Achievement of Wide Angle Visual Displays", IEEE International Conv. Record, 1963, W. Merel/H. Barkan, pp. 11–24.

*Primary Examiner*—Thomas W. Brown

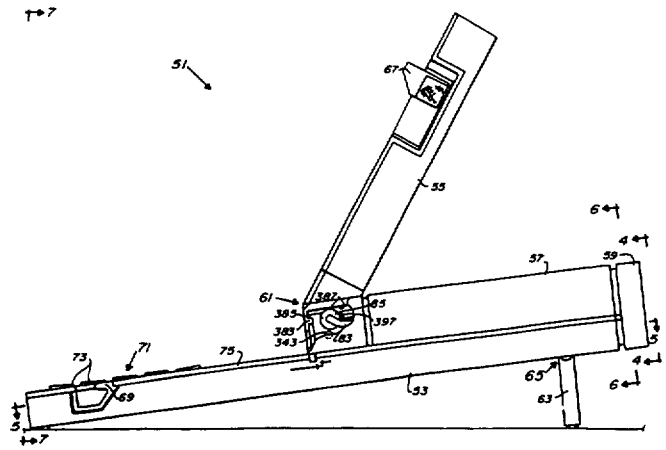

[57] ABSTRACT

A portable computer is contained within an outer metal case which physically encapsulates and protects the working components of the computer in the closed, portable configuration. The metal case includes a base which serves as a heat sink for transferring waste heat from heat producing electrical components to the surroundings in the open, operating configuration of the computer. The heat producing components are mounted and located in the base to maximize the transfer of heat to the base. A display housing is pivotally mounted on the base by hinge assemblies for swinging movement between a closed and latched position on the base and an upward and rearwardly inclined angle for viewing by an operating positioned in front of the computer. Stop pins coact with the hinge assemblies for holding the display housing at the desired angle of view, and torsion springs are associated with the hinge assemblies for preventing inadvertent slamming of the display housing against the base during closing. Electrical cables are guided from the base through the hinge assemblies and to the display by cable guides which protect the cables against snagging and unnecessary flexure. A single connector connects an audio circuit on a modem to use either a standard hand set for voice communications or a passive speaker and microphone as an acoustic coupler for data communications.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, between lines 41–42:

*The outer case or housing of the computer has a rectilinear exterior outline when the display housing is in its closed position as is illustrated in FIGS. 2-4. Further, hinges 61, leg 63 and latches 67, 69 (more fully described below) are positioned so that they are substantially wholly contained within the rectilinear exterior of the case.*

Column 6, lines 32–36:

As shown in FIGS. 7 and 8, the computer 51 comprises a *multiline, alphanumeric* graphic display which includes the display 77 and the display electronic board 79. The display includes the glass screen and driver chips 80 connected to the screen by a flexible circuit.

AS A RESULT OF REEXAMINATION, IT HAS BEEN DETERMINED THAT:

The patentability of claims 5, 8, 13–17 is confirmed.

Claims 1–4, 6, 9–12, 18–19 are cancelled.

Claim 7 is determined to be patentable as amended.

7. The invention defined in claim 1 including leg means rotatable from a retracted position against the base of the computer in the closed position of the computer to an extended position in the erected [an] *and operating configuration of the computer,* the leg means including movable pivot means and spring means for permitting the leg to be positively held in both the retracted position and the extended position.

* * * * *